(12) United States Patent
Tamaru et al.

(10) Patent No.: US 7,750,950 B2
(45) Date of Patent: Jul. 6, 2010

(54) IMAGE PICKUP APPARATUS AND IMAGE PROCESSING METHOD

(75) Inventors: Masaya Tamaru, Asaka (JP); Koichi Sakamoto, Asaka (JP); Koji Ichikawa, Asaka (JP); Masahiko Sugimoto, Asaka (JP); Manabu Hyodo, Asaka (JP); Kazuhiko Takemura, Asaka (JP); Hirokazu Kobayashi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 395 days.

(21) Appl. No.: 11/606,087

(22) Filed: Nov. 30, 2006

(65) Prior Publication Data

US 2007/0076113 A1 Apr. 5, 2007

Related U.S. Application Data

(62) Division of application No. 10/601,654, filed on Jun. 24, 2003.

(30) Foreign Application Priority Data

| Jun. 24, 2002 | (JP) | ............ P.2002-182924 |
| Jul. 15, 2002 | (JP) | ............ P.2002-205607 |
| Jul. 22, 2002 | (JP) | ............ P.2002-212517 |
| Aug. 16, 2002 | (JP) | ............ P.2002-237320 |

(51) Int. Cl.
H04N 9/73 (2006.01)

(52) U.S. Cl. ............ 348/227.1; 348/228.1; 348/229.1; 348/230.1

(58) Field of Classification Search .... 348/223.1–230.1
See application file for complete search history.

(56) References Cited

U.S. PATENT DOCUMENTS

| 5,455,621 | A | | 10/1995 | Morimura |
| 5,801,773 | A | * | 9/1998 | Ikeda .................. 348/229.1 |
| 6,204,881 | B1 | | 3/2001 | Ikeda et al. |
| 6,211,915 | B1 | | 4/2001 | Harada et al. |
| 6,593,970 | B1 | | 7/2003 | Serizawa et al. |
| 6,750,911 | B1 | * | 6/2004 | Kobayashi et al. .......... 348/273 |

(Continued)

FOREIGN PATENT DOCUMENTS

JP 5-183297 A 7/1993

(Continued)

*Primary Examiner*—Sinh Tran
*Assistant Examiner*—Anthony J Daniels
(74) *Attorney, Agent, or Firm*—Birch, Stewart, Kolasch & Birch, LLP

(57) ABSTRACT

An image combined high sensitivity image and low sensitivity image is provided with well-adjusted white balance and broad dynamic range. The image is obtained by multiplying the combined data by total gain that depends on scene. A white balance is adjusted with gain value calculated from of high output image data. Lv value representing luminance is calculated and compared with a threshold to decide whether or not the high sensitivity image and the low sensitivity image should be combined. First gamma correction unit performs gamma-correction for the image signal derived from the high sensitivity signal with first gamma character, second gamma correction unit performs gamma-correction for the image signal derived from the low sensitivity signal with second gamma character that is different from the first gamma character, and addition unit combines the image signal from the first gamma correction unit and the image signal from the second gamma correction unit.

7 Claims, 15 Drawing Sheets

U.S. PATENT DOCUMENTS

| | | | |
|---|---|---|---|
| 6,985,185 B1 * | 1/2006 | Crawford et al. | 348/362 |
| 2001/0001245 A1 | 5/2001 | Kamishima et al. | |
| 2001/0030708 A1 * | 10/2001 | Ide et al. | 348/362 |
| 2006/0050163 A1 * | 3/2006 | Wang et al. | 348/308 |

FOREIGN PATENT DOCUMENTS

| | | |
|---|---|---|
| JP | 10-136391 A | 5/1998 |
| JP | 11-155108 A | 6/1999 |
| JP | 11-168659 A | 6/1999 |
| JP | 2000-156797 A | 6/2000 |
| JP | 2000-156871 A | 6/2000 |
| JP | 2000-209492 A | 7/2000 |
| JP | 2000-307963 | 11/2000 |
| JP | 2000-350220 A | 12/2000 |
| JP | 2001-8104 A | 1/2001 |
| JP | 2002-135787 A | 5/2002 |
| JP | 2004-32171 A | 1/2004 |

* cited by examiner

IMAGE PICKUP APPARATUS AND IMAGE PROCESSING METHOD

This application is a Divisional of co-pending application Ser. No. 10/601,654 filed on Jun. 24, 2003, and for which priority is claimed under 35 U.S.C. §120; and this application claims priority of Japanese Application Nos. JP2002-182924 filed on Jun. 24, 2002, JP2002-205607 filed on Jul. 22, 2002 and JP2002-237320 filed on Aug. 16, 2002 under 35 U.S.C. §119; the entire contents of all are hereby incorporated by reference.

BACKGROUND OF THE INVENTION

1. Field of the Invention

The present invention relates to an image pickup apparatus and an image processing method of obtaining an image with a broad dynamic range.

2. Description of the Related Art

[Prior Art]

Dynamic range of image sensor such as CCD used in an image pickup device such as widely prevailing digital cameras are generally narrower than those of film. Hence, in the case of imaging a high luminance subject, the amount of received light exceeds the dynamic range. Then, the output of the image sensor saturates to cause the missing of the information of the subject imaged.

When, for example, an indoor scene is picked up by an imaging apparatus such as digital still cameras, it sometimes occurs that subjects present in the interior can be imaged well, but the blue sky observed through a window is imaged with saturation. The image picked up in the situation is unnatural as a whole. Such problem comes from the fact that the dynamic range of an image is narrow. To solve the problem, dynamic range is expanded by combining two images picked up separately.

For example, short time exposure image (low sensitivity image) is firstly picked up with high shutter speed, then long time exposure image (high sensitivity image) is successively picked up with low shutter speed. These two images are combined to superimpose the outdoor scene through the window in the low sensitivity image on the high sensitivity image in which the indoor scene is preferably picked up.

In a conventional technique described in JP-A-2000-307963, as the part of moving subjects do not perfectly coincide with low sensitivity image and high sensitivity image when the two images is combined, the high sensitivity image is partly replaced by the low sensitivity by using a mask.

In the above-described conventional technique of JP-A-2000-307963, although image signals of the two images are combined with use of the mask, the discrepancy of white balance is not considered. Therefore, as a result of that white balances of the high sensitivity image and the low sensitivity image in the combined image are respectively different, the combined image comes to be unnatural depending on an imaging scene.

Recently, an imaging apparatus such as digital cameras, which includes a new image pickup device having both of high sensitivity pixel and low sensitivity pixel, is proposed. The imaging apparatus combines a high sensitivity image (which will be also called "high output image" hereinafter) picked up by the high sensitivity pixel and a low sensitivity image (which will be also called "low output image" hereinafter) picked up by the low sensitivity pixel to output data of a single image. It is necessary to solve the problem associated with the above-described, when the image pickup apparatus combines images.

In the case of imaging a very bright subject under a high-contrast imaging condition, the image combination according to the conventional technique of JP-A-2000-307963 is effective in the reproduction of details in bright (highlight) portions, since the dynamic range is expanded. However, in the case of imaging under a low-contrast imaging condition such as a cloudiness or an interior, similar preferable effects are hardly achieved, or rather, the tone reproduction is wasted.

FIG. 18 shows the relation between a high sensitivity signal obtained by imaging a scene with a digital camera and the combined signal derived by combining the high sensitivity signal with a low sensitivity signal by a conventional technique. This figure depicts data associated with the signal of any one color among R (red), G (green) and B (blue). The ordinate indicates tone value, while the abscissa indicates subject luminance. The thin line in the figure is the high sensitivity signal prior to combination, and the thick line is the combined signal.

As shown in the figure, the region from a to b of the tone value of the high sensitivity signal (indicated by the hatched zone) is not utilized depending on the luminance of the scene by the combination operation. Therefore, there exist cases where it would be rather better that the image combination is not performed under a low-contrast imaging condition.

In another conventional technique described in JP-A-6-141229, the combination of two images is performed by converting each of the image signals obtained with low and high shutter through the same γ characteristics and then additively combining both signals that are each converted with γ characteristics. However, since simple addition gives an image in which the middle tone region that is strongly influential on image quality appears unnatural, weighted addition depending on signal levels is usually carried out.

The conventional technique of JP-A-6-141229 intends to retain a preferable tone reproduction in the middle tone region through weighted addition of the image signals of the two images depending on signal levels and only the image signal with the high sensitivity is used for the middle tone region. However, even if a weighted addition depending on signal levels is performed, the white balance of the middle tone tends to differ from that of the highlights tone when each white balances of two images with high sensitivity and low sensitivity is not accurately adjusted. As a result, a combination image comes to be unnatural.

SUMMARY OF THE INVENTION

The first object of the present invention is to provide an image pickup apparatus and an image processing method of combining and outputting an image with broad dynamic range while adjusting a white balance.

The second object of the present invention is to provide an image pickup apparatus for obtaining preferable images with tone values in high luminance side while expanding dynamic range by displaying images based on image signals corresponding to the imaging condition.

The third object of the present invention is to provide an image pickup apparatus for combining and outputting images, which is less unnatural, with broad dynamic range without precisely adjusting white balance.

The invention provides an image combination method of image-combining a high output image data and a low output image data has the steps of multiplying a combined data of the high output image data and the low output image data by a total gain that depends on a scene. According to the method, it becomes possible to obtain combined images provided with a broad dynamic range and a well-adjusted white balance.

Preferably, the total gain is multiplied on the combined data of the high output image data and the low output image data in a range that the high output image data exceeds a certain value, and the range that the high output image data exceeds a certain value is range that the total gain p exceeds a value represented by [arbitrary numeral "α"–coefficient "k"× (high output image data after gamma-correction "high")/ threshold "th")]. Further, the coefficient "k"=0.2, the arbitrary numeral "α"=1, the total gain p="0.8" for high contrast scenes, the total gain "p"=0.86 for cloudy or shady scenes, the total gain "p"=0.9 for indoor scenes under fluorescent lamp illumination. Therefore, preferable combined images well fits original scenes can be obtained.

The invention provides an image pickup apparatus for image-combining a high output image data and a low output image data, has multiplying means for multiplying a combined data of the high output image data and the low output image data by a total gain that depends on a scene. According to the apparatus, it becomes possible to obtain combined images provided with a broad dynamic range and a well-adjusted white balance.

Preferably, the multiplying means multiplies the combined data of the high output image data and the low output image data by the total gain in a range that the high output image data exceeds a certain value and the range that the high output image data exceeds a certain value is range that the total gain p exceeds a value represented by [arbitrary numeral "α"– coefficient "k"×(high output image data after gamma-correction "high")/threshold "th")]. Further, the coefficient "k"=0.2, the arbitrary numeral "α"=1, the total gain p="0.8" for high contrast scenes, the total gain "p"=0.86 for cloudy or shady scenes, the total gain "p"=0.9 for indoor scenes under fluorescent lamp illumination. Therefore, preferable combined images well fits original scenes can be obtained.

The invention provides an image pickup apparatus for combining image data of a high output image and image data of a low output image, both of which are picked up by an imaging device, to produce combined image data has: a calculating unit for calculating a gain value for white balance adjustment from the image data of the high output image; a gain correcting unit for performing not only first white balance adjustment for the image data of the high output image with the gain value calculated by the calculating unit but also second white balance adjustment for the image data of the low output image with the gain value. According to the apparatus, it becomes possible to generate a combined image, which is natural, with least discrepancy in white balance and a broad dynamic range.

The invention provides an image pickup apparatus for combining image data of a high output image and image data of a low output image, both of which are picked up by an imaging device, to produce combined image data has: a calculating unit for calculating a gain value for white balance adjustment from the image data of the high output image; a gain correcting unit for performing a white balance adjustment for the combined image data with the gain value calculated by the calculating unit. According to the apparatus, it also becomes possible to generate a combined image, which is natural, with least discrepancy in white balance and a broad dynamic range.

The invention provides an image processing method of combining image data of a high output image and image data of a low output image, both of which are picked up by an imaging device, to produce combined image data has the step of: calculating a gain value used for first white balance adjustment for the image data of the high output image and second white balance adjustment for the image data of the low output image from the image data of the high output image. According to the method, it becomes possible to generate a combined image, which is natural, with least discrepancy in white balance and a broad dynamic range.

The invention provides an image processing method of combining image data of a high output image and image data of a low output image, both of which are picked up by an imaging device, to produce combined image data has the step of: calculating a gain value used for a white balance adjustment for the combined image data from the image data of the high output image. According to the method, it also becomes possible to generate a combined image, which is natural, with least discrepancy in white balance and a broad dynamic range.

The invention provides an image pickup apparatus has: an imaging device including first photoreceptors which receive light from a subject with a first sensitivity to output signals corresponding to the amount of the received light, and second photoreceptors which receive light from a subject with a second sensitivity lower than the first sensitivity to output signals corresponding to the amount of the received light; received light calculating means for calculating the amount of light received by the imaging device; judging means for judging whether or not the amount of the received light calculated by the received light calculating means exceeds a predetermined value; and display means for displaying an image based on combination signals derived from combining signals output from the first photoreceptors and signals output from the second photoreceptors when the judging means judges that the amount of the received light exceeds the predetermined value, while displaying an image based on signals output from the first photoreceptors when the judging means judges that the amount of the received light is equal or below the predetermined value.

The image pickup apparatus is provided an imaging device including the first photoreceptors which receive the light from a subject with a first sensitivity to output signals corresponding to the amount of the received light, and the second photoreceptors which receive the light from a subject with a second sensitivity lower than the first sensitivity to output signals corresponding to the amount of the received light. The second photoreceptors may be arranged so as to lie between the first photoreceptors, or placed on the first photoreceptors which are provided with means such as a channel stopper that prevents the amounts of received light from mixing. There is no limitation on the arrangement of the second photoreceptors.

The received light calculating means calculates the amount of light received by the imaging device. The judging means judges whether or not the amount of received light calculated by the received light calculating means exceeds a predetermined value. In the case where the light amount of the image pickup apparatus is judged to exceed the predetermined value, the display means displays an image by using the signal derived by combining the signals output from the first photoreceptors and the second photoreceptors, and in the case where the light amount received by the image pickup apparatus is judged not to exceed the predetermined value, displays an image by using the signals from the first photoreceptors.

Since an image is displayed, for the case where the light amount received by the imaging device (i.e., the luminance of the imaging circumstance) exceeds the predetermined value, by using the signal derived by combining the high sensitivity signals picked up by the first photoreceptors and the low sensitivity signals picked up by the second photoreceptors, and further, for the case where the received light amount does not exceed the predetermined value, by using the signals output from the first photoreceptors, preferable effects are achieved including broad dynamic range and an effective use of tone values towards the high luminance limit.

In displaying images with the display means, it is possible to always combine the signals output from the first photoreceptors and the signals output from the second photoreceptors, and to use the combined signals for image display depending on the judging result by the judging means. Alternatively, it is possible not to combine the two kinds of signals consistently and combine them depending on the judgment of the judging means for image display.

Moreover, the received light calculating means calculates the amount of received light on the basis of an f number and shutter speed of the image pickup apparatus.

Therefore, the luminance of the imaging environment can be accurately estimated from the f number and the shutter speed. Thus, the judgment by the judging unit becomes highly accurate.

The invention provides An image pickup apparatus for additively combining a low sensitivity image signal and a high sensitivity image signal to generate an image with broad dynamic range, has: first gamma correction means for performing gamma correction for the high sensitivity image signal with a first gamma character; second gamma correction means for performing gamma correction for the low sensitivity image signal with a second gamma character which is different from the first gamma character; and combining means for additively combining image signals output from the first gamma correction means and that image signals output from the second gamma correction means.

According to the apparatus, it becomes possible to provide images not giving unnatural impression without executing weighted addition depending on signal levels in the additive combination operation.

Preferably the gamma value of the first gamma character is larger than the gamma value of the second gamma character, and moreover, the gamma value of the first gamma character is 0.45, while the gamma value of the second gamma character is 0.18. According to the apparatus, more preferable images can be obtained which are still far from unnatural impression and less deteriorated in white balance as well as middle tone rendition.

DETAILED DESCRIPTION OF THE PREFERRED EMBODIMENTS

In the following, four practical embodiments of the invention are described with reference to the drawings.

First Embodiment

Figure 1:
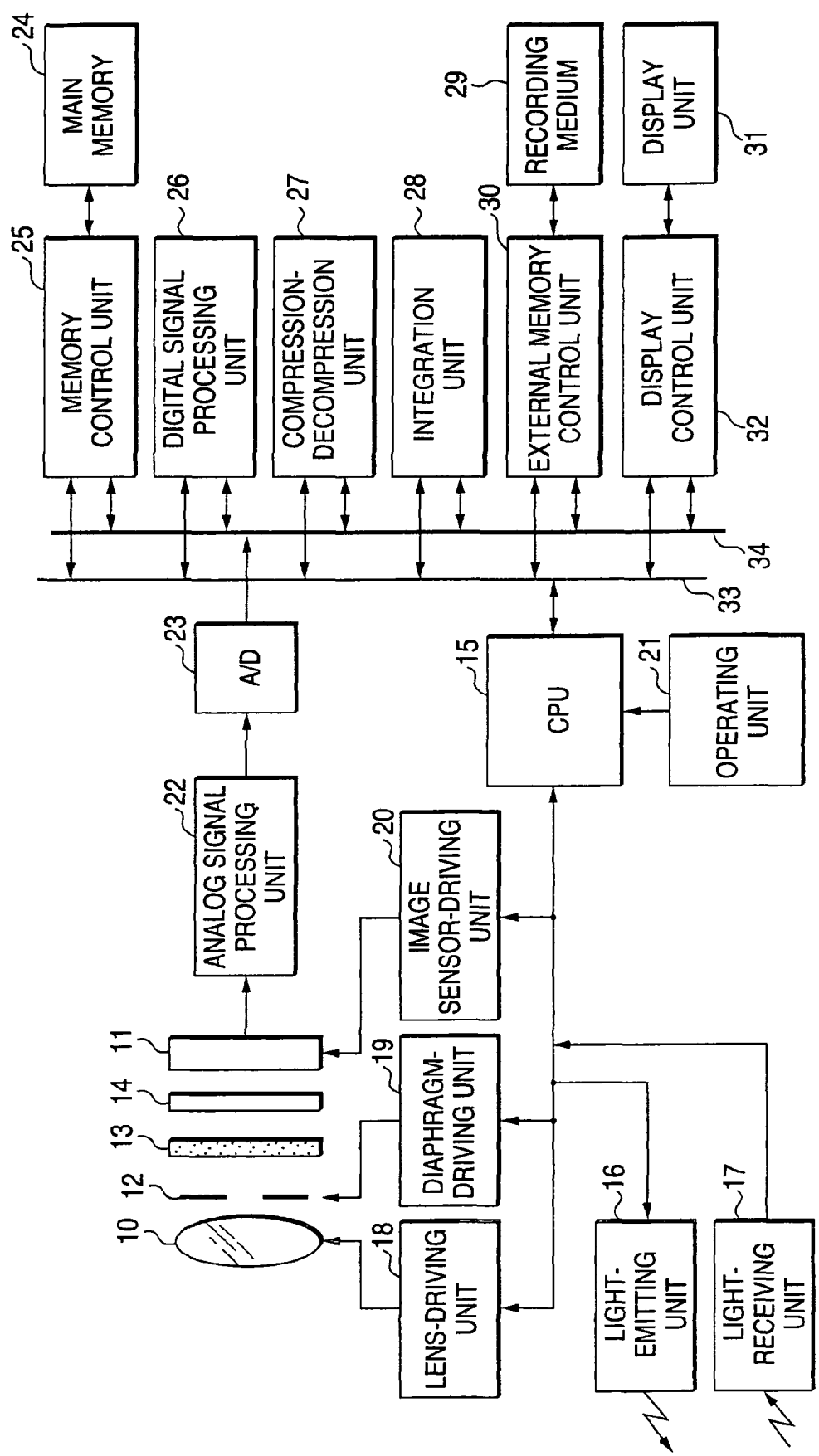
FIG. 1 is a block diagram of a digital still camera associated with one embodiment of the invention.

FIG. 1 is a block diagram of a digital still camera of first embodiment according to the invention. In the first embodiment, the digital still camera is explained for an example, while it is applicable to other types of an image pickup apparatus such as digital video cameras. An image combination operation in the embodiment is performed by software in a digital signal processing unit 26 to be described later, while the image combination operation can be also performed by a hardware circuit.

The digital still camera shown in FIG. 1 has an imaging lens 10, a solid-state image sensor 11, a lens diaphragm 12 that is positioned between the imaging lens 10 and a solid-state image sensor 11, an infrared-cut filter 13 and an optical low pass filter 14. A CPU 15, which controls the entire digital still camera, controls a light-emitting unit 16 and a light-receiving unit 17 both for photoflash, adjusts a lens-driving unit 18 to regulate the position of the imaging lens 10 to the focus position, and controls via a diaphragm-driving unit 19 the aperture of the lens diaphragm 12 so as to achieve a correct amount of exposure.

Further, the CPU 15 drives the solid-state image sensor 11 via the image sensor-driving unit 20 whereby the image of the subject captured through the imaging lens 10 is outputted in the form of color signals. Separately, command signals from the camera user are input to the CPU 15 via an operating unit 21. The CPU 15 performs various controls in accordance with these commands.

The electric control system of the digital still camera has an analog signal processing unit 22 connected to an output terminal of the solid-state image sensor 11, and an A/D converting circuit 23 which converts RGB color signals output from this analog signal processing unit 22 to digital signals. These two components are controlled by the CPU 15.

The electric control system of the digital still camera has a memory control unit 25 connected to a main memory 24, a digital signal processing unit 26 which will be described in detail later, a compression-decompression unit 27 which compresses captured images to JPEG ones or decompresses compressed images, an integration unit 28 which integrates measured light intensity data of the image data that was converted to digital data by A/D converting circuit 23, an external memory control unit 30 to which a removable recording medium 29 is connected and a display control unit 32 to which a display unit 31 provided at the rear surface of the camera is connected. These components are mutually connected through a control bus 33 and a data bus 34, and controlled by the command from the CPU 15.

Though each of the digital signal processing unit 26, the analog signal processing unit 22, and the A/D converting circuit 23 may be installed as a separate circuit in the digital still camera, they are preferably fabricated into a semi-conductor board together with the solid-state image sensor 11 by using LSI manufacturing techniques to give a unified solid-state image pickup device.

Figure 2:
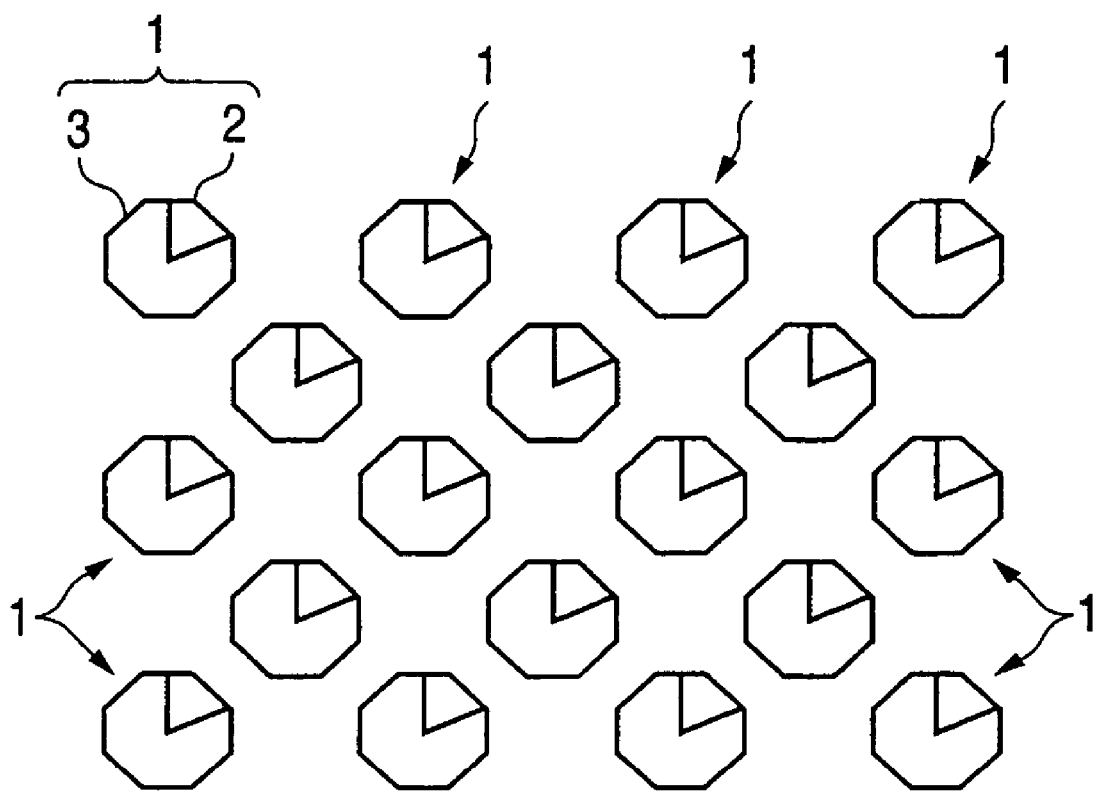
FIG. 2 shows the pixel arrangement of the solid-state image sensor shown in FIG. 1.

FIG. 2 shows the pixel arrangement in the solid-state image sensor 11 used in the present embodiment. Pixels 1 in the CCD section that captures dynamic range-expanded images are arranged as described in, for example, JP-A-10-136391 wherein each pixel in an odd-numbered line is shifted in the horizontal direction by a half pitch relative to each pixel in an even-numbered line and wherein the vertical transfer path (not shown) that transfers the signal charge read out of each pixel in the vertical direction runs zigzag so as to get away from every pixel lying in the vertical direction.

Further, the individual pixel 1 associated with the embodiment shown in the figure is structured so as to be divided into a low speed pixel 2 occupying about one fifth of the total area of pixel 1 and a high speed pixel 3 occupying the remaining, about four fifth of the total area. And the system is constructed so that the signal charge from the individual low speed pixel 2 and that from the individual high speed pixel 3 are separately read out and transferred to the above-described vertical transfer path. The ratio in and the position at which the pixel 1 is to be divided are determined from the designing point of view. Thus, the structure shown in FIG. 2 is just an example.

The image pickup unit of the embodiment is designed and fabricated so that a low sensitivity image (the image captured by the low speed pixel 2) and a high sensitivity image (the image captured by the high speed pixel 3) are acquired simultaneously, and that image signals are read out sequentially from the individual pixels 2 and 3, which are additively combined for output as described in detail later.

The solid-state image sensor 11, which was described for the example of a honeycomb type pixel arrangement as shown in FIG. 2, may be of Bayer type CCD or CMOS sensor.

Figure 3:
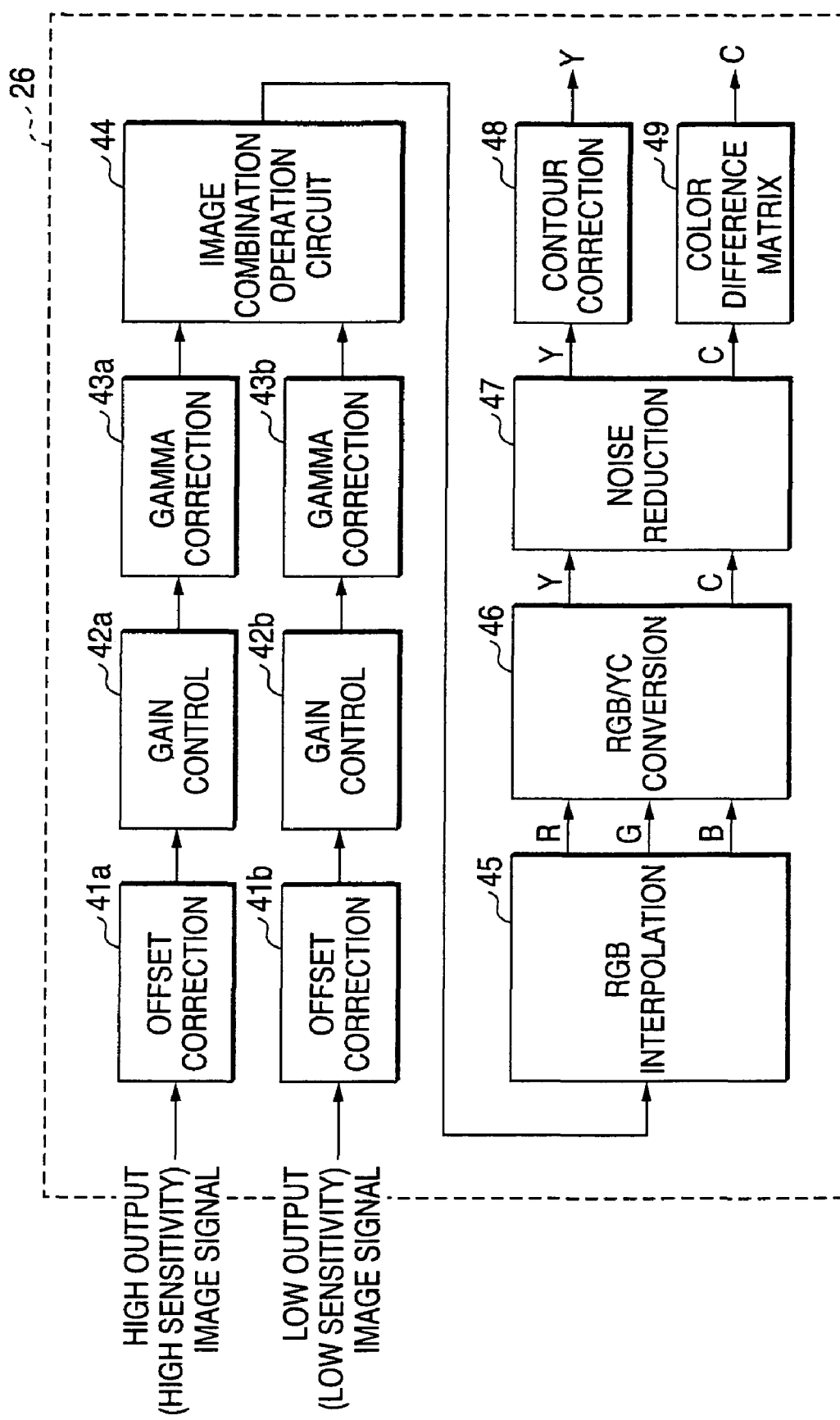
FIG. 3 is a detailed block diagram of the digital signal-processing unit shown in FIG. 1.

FIG. 3 is a detailed block diagram of the digital signal processing unit 26 shown in FIG. 1. This digital signal processing unit 26, which adopts a logarithmic addition method in which the high sensitivity image signal and the low sensitivity image signal are added after respective gamma correction. The digital signal processing unit 26 includes an offset correction circuit 41a which takes in RGB color signals consisting of digital signals of the high sensitivity image outputted from the A/D conversion circuit 23 shown in FIG. 1 and executes an offset correction operation on those signals, a gain control circuit 42a which adjusts white balance of the output signals from the offset correction circuit 41a, a gamma correction circuit 43a which executes gamma correction on the color signals after gain control, an offset correction circuit 41b which takes in RGB color signals consisting of digital signals of the low sensitivity image outputted from the A/D conversion circuit 23 shown in FIG. 1 and executes an offset correction operation on those signals, a gain control circuit 42b which adjusts the white balance of the output signals from the offset correction circuit 41b, and a gamma correction circuit 43b which executes gamma correction for the color signals after gain control. In the cases where a linear matrix operation is executed for the offset-corrected signal, such operation is performed between the gain control circuit 42a, 42b and the gamma correction circuit 43a, 43b.

The digital signal processing unit 26 further includes an image combination operation circuit 44 which takes in both of the output signals from the gamma correction circuits 43a, 43b and performs image combination operation as described in detail later, an RGB interpolation unit 45 which calculates RGB three color signals at each pixel position via the interpolating calculation of the RGB color signals after image combination, an RGB/YC conversion circuit 46 which obtains a luminance signal Y and color difference signals Cr, Cb from the RBG signals, a noise filter 47 which reduces noise from the luminance signal Y and color difference signals Cr, Cb, a contour correction circuit 48 which executes contour correction on the noise-reduced luminance signal Y, and a color difference matrix circuit 49 which executes color correction by multiplying a color difference matrix on the color difference signals Cr, Cb.

The RGB interpolation unit 45 is not needed for three plates-type image sensors. However, since the solid-state image sensor 11 of the embodiment is single plate-type of which each pixel outputs one color signal among R, G and B signals. Therefore, the RGB interpolation unit 45 estimates the intensities of the colors the signals of which a certain pixel does not output, i.e., G and B color signals at the position of an R signal-outputting pixel, by interpolation with use of the G and B signals at the surrounding pixels.

The image combination operation circuit 44 combines the high sensitivity image signal outputted from the gamma correction circuit 43a and the low sensitivity image signal outputted from the gamma correction circuit 43b according to the following formula by pixels and outputs the combined signal.

$$data=[high+MIN(high/th,1) \times low] \times MAX[(-k \times high/th)+\alpha, p] \quad (1)$$

wherein, high: gamma-corrected data of the high sensitivity (high output) image signal low: gamma-corrected data of the low sensitivity (low output) image signal p: total gain k: coefficient th: threshold, and α: a value determined by the scene (≅1)

The threshold "th" is a value that the user or designer of the digital still camera designates, exemplified by "219" chosen from the values ranging from 0 to 255 in the case where the gamma-corrected data is of 8 bit (containing 256 tonal steps).

The first term in the above formula (1) indicates that, when the high sensitivity image data high exceeds the threshold "th", the low sensitivity image data low is directly added to the high sensitivity image data high, and that, when the high sensitivity image data high does not exceeds the threshold "th", to the high sensitivity image data high is added a value obtained by multiplying the low sensitivity image data low by the ratio of the high sensitivity image data high to the threshold "th".

The embodiment is characterized by that the added data obtained in the first term is not used as combined image data, but that the value derived by multiplying the first term value by the second term value (MAX[(−k×high/th)+α, p]) is used as the combined image data.

In the second term, the coefficient "k" is preferably "0.2" for the solid-state image sensor 11 used in the embodiment shown in FIG. 2. For a solid-state image sensor 11 shown in FIG. 2 wherein the saturation ratio of signal charge of the high sensitivity pixel 3 and the low sensitivity pixel 2 are respectively different, the coefficient k can be calculated by the following formula (2) for convenience.

$$\text{coefficient } k = 1 - Sh/(Sh + Sl) \tag{2}$$

wherein

Sh: the saturation amount of signal charge of the high sensitivity pixel

Sl: the saturation amount of signal charge of the low sensitivity pixel

Although, strictly speaking, the area ratio of the photodiode does not always represent the ratio of the saturation charge amounts, let us approximate here that the area ratio represents the saturation ratio for convenience in the case shown in FIG. 2. Then, by applying the above formula (2), $$k = 1 - 4/(4+1) = 1 - 0.8 = 0.2$$

Figure 5:
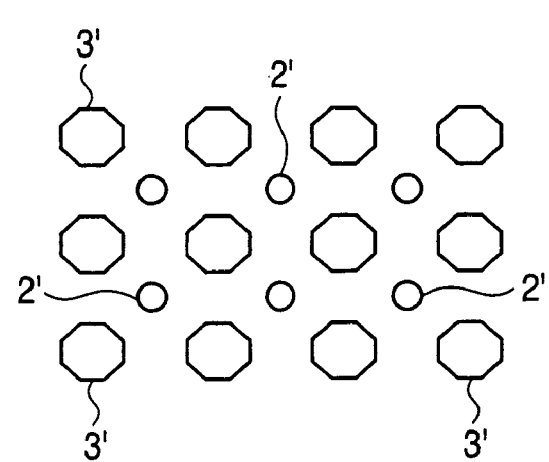
FIG. 5 shows the pixel arrangement of a solid-state image sensor associated with another embodiment.

As the solid-state image sensor having high sensitivity and low sensitivity pixels, another array shown in FIG. 5 in which high sensitivity pixels 3' and low sensitivity pixels 2' are formed by changing the aperture area of the micro-lens provided on each of a large number of photodiodes (not shown) all fabricated in the same dimension and shape can be used in addition to the one shown in FIG. 2. For this type of image sensor, the above formula (2) is not applicable since the saturation amount of signal charge is the same for the high and low sensitivity pixels. However, the formula (1) can be applied by obtaining the value for coefficient "k" experimentally or by estimating it from the aperture area of the micro-lenses. This value of coefficient "k" is determined by the configuration of the solid-state image sensor, and is set at a fixed value at the time of shipping which the user cannot alter at his will.

As the value of total gain "p" in the formula (1), the embodiment adopts experimentally determined ones. The total gain "p" represents the gain for the overall combined image data, and the embodiment controls the dynamic range of the image by controlling this value of "p". When the total gain "p" is small, the dynamic range is broad. When the total gain "p" is large, the dynamic range narrows. Specifically, the value of "p" is changed depending on scenes as exemplified by P=0.8 for high contrast scenes (those under the clear midsummer sky), P=0.86 for cloudy and shady scenes, and P=0.9 for indoor scenes under fluorescent lamp illumination. With such a scheme, 8 bit quantization levels can be more effectively utilized when the gamma-corrected data are of 8 bits.

The value of "p" may be automatically determined by the automatic judgment which the digital still camera performs based on the data detected by various sensors thereof, or may be set by the camera user who designates the type of scene via the operating unit 21 shown in FIG. 1.

Figure 4:
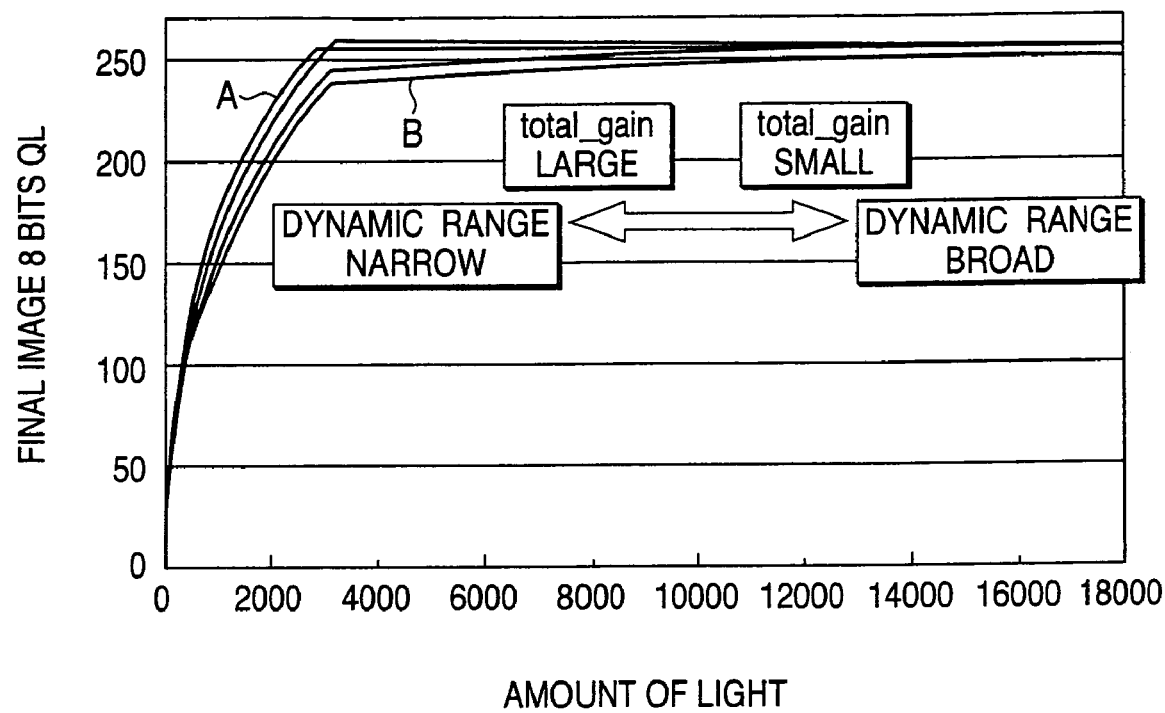
FIG. 4 is a diagram showing how the dynamic range changes.

FIG. 4 is a diagram showing how the dynamic range changes when the value of "p" is changed. In Curve A for a large total gain "p", the dynamic range is small. Along with the diminution of the total gain "p", the shape of the curve changes to finally reach Curve B having a broad dynamic range.

In the formula (1), the value of "α", which may be changed corresponding to the type of the scene to be captured by the camera, may take a fixed value "1".

As described above, according to the embodiment, the combination of the high sensitivity image data and the low sensitivity image data are combined, and thereafter the total gain that depends on scenes is multiplied by the combined data. Images with a well-adjusted white balance and a broad dynamic range can be provided as scenes picked up. Furthermore, since a logarithmic addition method wherein the number of bits for each of the high and low sensitivity image data is reduced prior to addition is adopted for image combination, a small circuit dimension suffices, leading to cost reduction in camera manufacture.

In the embodiment described above, an example has been explained in which a high output image (high sensitivity image) and a low output image (low sensitivity image) both captured by a digital still camera is combined within the camera. But, the concept of the invention is applicable to cases wherein a high sensitivity image data and a low sensitivity image data captured by an image pickup device are once stored in a memory, which data (CCD-RAW data) are fed to, for example, a PC, and wherein an image combination operation similar to the one executed by the digital signal processing unit 26 in the above-described embodiment is performed on those data in order to provide a combined image having a well-adjusted white balance and a broad dynamic range.

Furthermore, in the embodiment described above, the image captured by the low sensitivity pixel was defined as a low sensitivity image, and the one captured by the high sensitivity pixel as a high sensitivity image. However, the invention is not restricted to cases where images of different sensitivities are combined, but also applicable to cases where a plurality of images that have been captured by the same pixel with use of varied aperture values of the diaphragm are combined. For example, in the case of sequentially imaging multiple images of a high-contrast still life with varied exposure amounts, the image captured with a large aperture acts as a high output image since the output signal levels from individual pixels are high, while the image captured with a small aperture acts as a low output image since the output signal levels from individual pixels are lower than those of the high output image. The concept of the abode-described embodiment is applicable for the combination of those images.

Second Embodiment

Configuration of a digital still camera according to second embodiment is same as that of a digital still camera according to the first embodiment shown in FIG. 1, except a digital signal processing unit. Therefore, a digital signal processing unit of the embodiment is denoted by "26a" in FIG. 6 and "26b" in FIG. 7.

Figure 6:
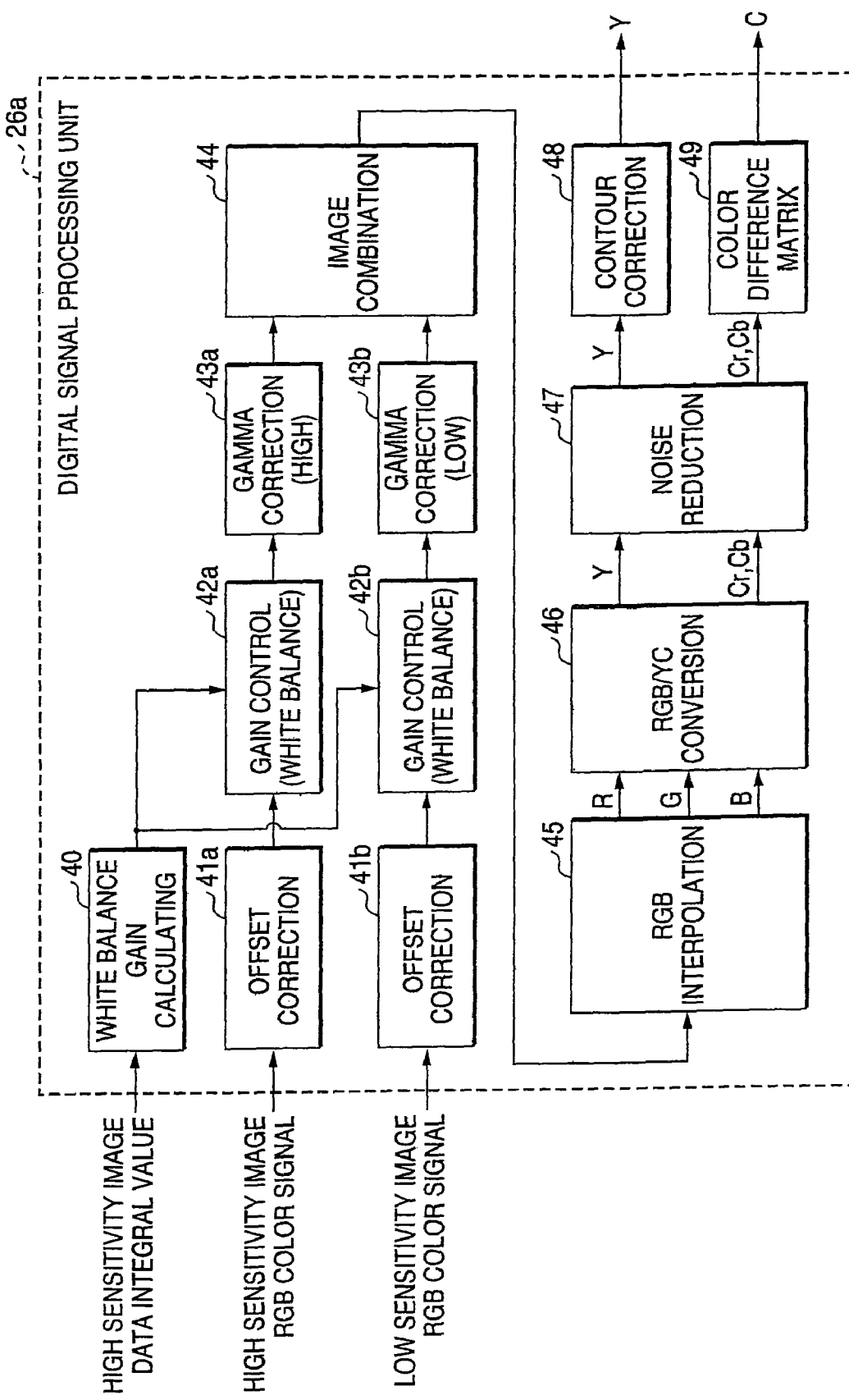
FIG. 6 is a detailed block diagram of the digital signal-processing unit shown in FIG. 1.

FIG. 6 is a detailed block diagram of the digital signal processing unit 26a. This digital signal processing unit 26a may be constructed in the form of a hardware circuit or software. In the embodiment, the digital signal processing unit 26a will be described for the case where a low sensitivity image picked up with a high shutter speed (This image is also called "low output image", since the output from each pixel is low.) and a high sensitivity image sequentially picked up with a low shutter speed (This image is also called "high output image", since the output from each pixel is higher than the data of the low output image.) are combined.

The digital signal processing unit 26a has a white balance gain calculating circuit 40 that calculates the gain value for white balance adjustment on taking in the output data from the integration unit 28 shown in FIG. 1, a first offset correction circuit 41*a* that takes in RGB color signals of the high output image output from the A/D conversion circuit 23 and executes an offset correction operation on those signals, a first gain control circuit 42*a* that adjusts white balance of the output signal from the first offset correction circuit 41*a* with the gain value calculated by the gain calculating circuit 40, and a first gamma correction circuit 43*a* that executes gamma correction for the high output image data output from the first gain control circuit 42*a* with "γ" value for the high output image.

The digital signal processing unit 26*b* further has a second offset correction circuit 41*b* that takes in RGB color signals of the low output image output from the A/D conversion circuit 23 and executes an offset correction operation on those signal, a second gain control circuit 42*b* that adjusts white balance of the output signal from the second offset correction circuit 41*b* with the gain value calculated by the gain calculating circuit 40, a second gamma correction circuit 43*b* that executes gamma correction for the low output image data output from the second gain control circuit 42*b* with "γ" value for the low output image, and an image combination circuit 44 that combines the output data from the first gamma correction circuit 43*a* and the output data from the second gamma correction circuit 43*b* on each pixel basis.

The digital signal processing unit 26*a* further includes an RGB interpolation unit 45 which calculates the RGB three color signals at each pixel position via the interpolating calculation of the RGB color signals in the combined image data (the output signal of the image combination circuit 44), an RGB/YC conversion circuit 46 which obtains a luminance signal Y and color difference signals Cr, Cb from the RBG signals, a noise filter 47 which reduces noise from the luminance signal Y and the color difference signals Cr, Cb, a contour correction circuit 48 which executes contour correction for the noise-reduced luminance signal Y, and a color difference matrix circuit 49 which executes color correction by multiplying a color difference matrix on the color difference signals Cr, Cb.

The RGB interpolation unit 45 is not needed for three plates-type image sensors. However, since the solid-state image sensor 11 of the embodiment is single plate-type of which each pixel outputs one color signal among R, G and B signals. Therefore, the RGB interpolation unit 45 estimates the intensities of the colors the signals of which a certain pixel does not output, i.e., G and B color signals at the position of an R signal-outputting pixel, by interpolation with use of the G and B signals of the surrounding pixels.

Now, the operation of the digital still camera described above is explained. When the user inputs the command of capturing a dynamic range-expanded combined image via the operating unit 21, the CPU 15 firstly picks up a low sensitivity image of a scene with a high shutter speed, and then picks up a high sensitivity image of the same scene with a low shutter speed. The digital signal processing unit 26*a* takes in these two image data to combine.

The RGB signals (digital signals) of the high sensitivity image are taken in the digital signal processing unit 26*a* on pixel-by-pixel basis, and subjected to offset correction in the first offset correction circuit 41*a* at first, and then performed white balance adjustment in the first gain control circuit 42*a*. The gain value used for this white balance adjustment is calculated by the white balance gain calculating circuit 40, which derives this gain value from the integral value of the high sensitivity image integrated by the integration unit 28. The gain-corrected high sensitivity image data is subjected to gamma correction by the first gamma correction circuit 43*a* with "γ" value for the high sensitivity image, and then output to the image combination circuit 44.

On the other hand, the RGB signals (digital signals) of the low sensitivity image are taken in the digital signal processing unit 26*a* on pixel-by-pixel basis, and subjected to offset correction in the second offset correction circuit 41*b* at first, and then performed white balance adjustment in the second gain control circuit 42*b*. The gain value used for this white balance adjustment is also calculated by the white balance gain calculating circuit 40. In the embodiment, the gain value for the white balance adjustment of the low sensitivity image is also calculated from the integral value of the high sensitivity image integrated by the integration unit 28. The gain-corrected low sensitivity image data is subjected to gamma correction by the second gamma correction circuit 43*b* with "γ" value for the low sensitivity image, and then output to the image combination circuit 44.

The image combination circuit 44 additively combines the high sensitivity image data and the low sensitivity image data on pixel-by-pixel basis, and outputs image data, which is formed by luminance signal Y and color-difference signals Cr, Cb, via the RGB interpolation unit 45, the RGB/YC conversion circuit 46, the noise filter 47, the contour-correcting circuit 48 and the color-difference matrix circuit 49. By such processing, the image data comes to be with a broad dynamic range and well-adjusted white balance to be natural, then stored in the recording medium 29.

As described above, in the embodiment, the white balance adjustment for the low sensitivity image is performed with the gain value obtained from the image data of the high sensitivity image when the image combination of the high sensitivity image (high output image) and the low sensitivity image (low output image) are combined. Accordingly, no white balance discrepancy ever takes place in the combined image of the low and high sensitivity images, thus enables to obtain the combined image to be natural.

Since the high and low sensitivity images of the same object shot sequentially with a very short interval essentially are picked up with the same light source, the gain value used for white balance adjustment is essentially the same. However, it is highly probable that the image data of the low sensitivity image goes into a region where the derivation of the gain value for white balance adjustment is almost impossible, and that therefore a value largely deviated from the gain value obtained from the high sensitivity image data may be derived. The embodiment performs the white balance adjustment for the low sensitivity image with the gain value derived from the high sensitivity image data from the viewpoint of color reproduction and smooth continuity of color.

The present method can obtain a combined image substantially free of white balance discrepancy even in cases where a low sensitivity image and a high sensitivity image are combined from fraction to fraction with use of a mask in some conventional techniques as described JP-A-2000-307963, even though all the pixel data of the low and high sensitivity images were used for additive combination to give rise to a combined image.

Figure 7:
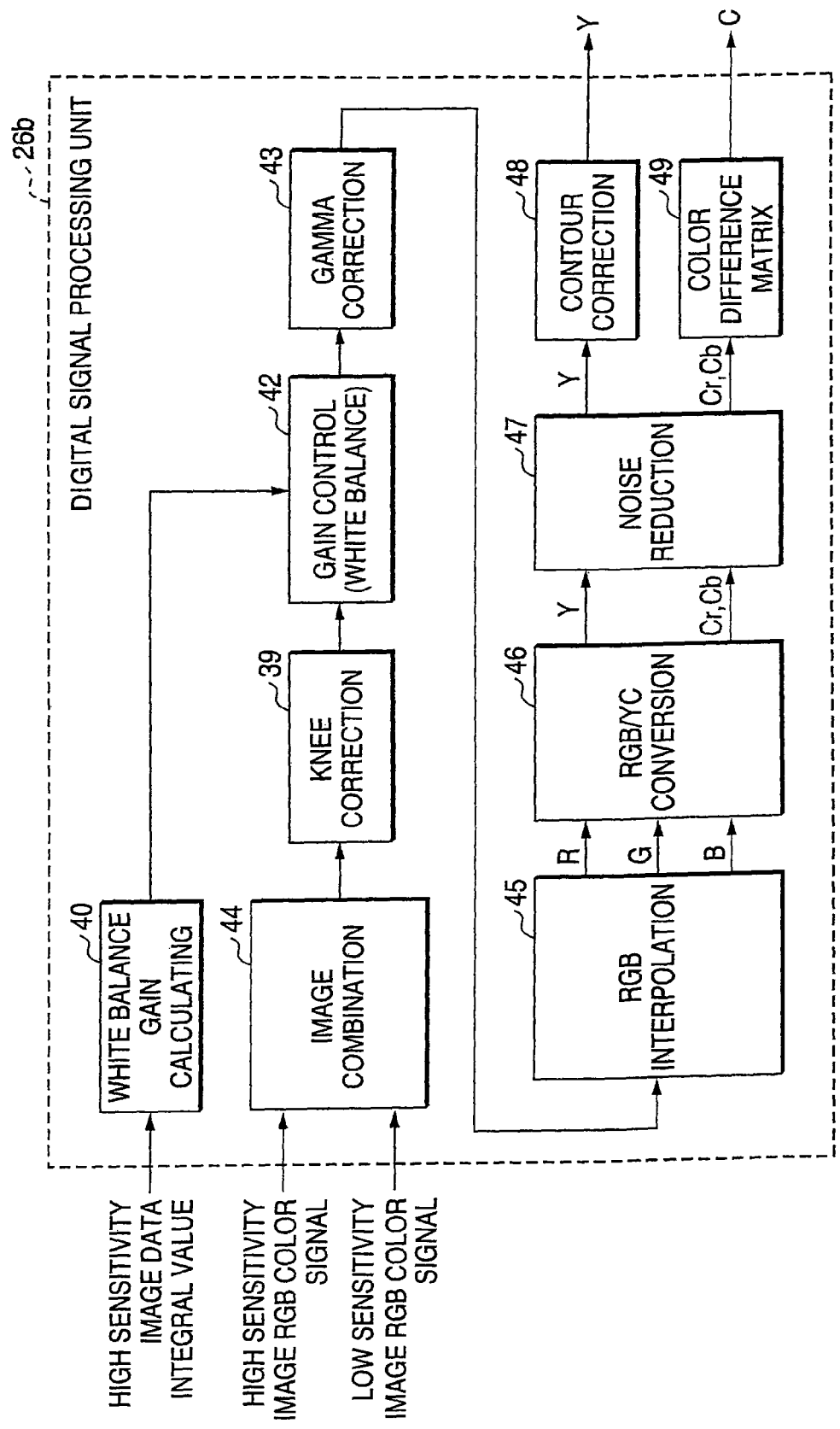
FIG. 7 is a detailed block diagram of the digital signal-processing unit associated with another embodiment.

The image combination executed by the digital signal processing unit 26*a* in FIG. 6 is called "logarithmic addition method" in which the low and high sensitivity images are combined after respective gamma conversion. In contrast, there is another image combination method called "arithmetic addition method" in which the low and high sensitivity images prior to gamma conversion are combined together, followed by gamma conversion. FIG. 7 shows the block diagram of the digital signal processing unit 26*b* associated with another embodiment in which the invention is applied to a digital still camera carrying out arithmetic addition method.

The digital signal processing unit 26b associated with the another embodiment has a white balance gain calculating circuit 40, an image combination circuit 44 which takes in the RGB color signals of the high sensitivity images and the RGB color signals of the low sensitivity images on pixel-by-pixel basis and to additively combine, a knee correction circuit 39 which executes a knee correction process for the output data (combined image data) from the image combination circuit 44, a gain control circuit 42 which executes gain corrections including white balance adjustment for the combined image data after the knee correction, a gamma correction circuit 43 which executes gamma correction for the gain corrected combined image data, an RGB interpolation circuit 45, an RGB/YC conversion circuit 46, a noise filter 47, a contour-correcting circuit 48 and a color-difference matrix circuit 49.

Again, in the digital signal processing unit 26 of the another embodiment, the gain control circuit 42 adopts the gain value derived from the integrated value of the high sensitivity image data for the white balance adjustment executed by the gain control circuit 42, while the low sensitivity image data is not used for the derivation of gain value. The combined image prepared by the arithmetic addition method executed by the digital signal processing unit 26 in the another embodiment is also provided with a well-adjusted white balance without discrepancy and a broad dynamic range.

In the above-described embodiments, the image captured with a high shutter speed was called low sensitivity image, and the one with a low shutter speed was called high sensitivity image. However, the scope of the invention is not limited to cases for image combination of different sensitivity images, but is applicable to cases for image combination of a plurality of images obtained with the same shutter speed and different diaphragm apertures.

For example, in the case of sequentially imaging multiple images of a high-contrast still life with varied exposure amounts, the image captured with a large aperture acts as a high output image since the output signal levels from individual pixels are high, while the image captured with a small aperture acts as a low output image since the output signal levels from individual pixels are lower than those of the high output image.

In the above-described embodiments, an example of image combination in which a plurality of images sequentially captured with a high shutter speed and a low shutter speed was explained. But the invention is applicable to the image combination in which a plurality of solid-state image sensors one of which captures a high sensitivity image and another one of which captures a low sensitivity image are loaded in the image pickup device and in which the captured plural images are combined.

Moreover, the invention is applicable to the image combination in which both of high sensitivity pixels and low sensitivity pixels are loaded in a single solid-state image sensor and in which the images read out of the high and low sensitivity pixels are combined. In such a case, the gain value for white balance adjustment is calculated on the basis of the high output image read out of the high sensitivity pixels or the solid-state image sensor both of which store larger amounts of signal charge under the same shutter speed and the same diaphragm aperture.

In the above-described embodiments, an example has been explained in which a high output image and a low output image both captured by a digital still camera is combined within the digital still camera. But, the concept of the invention is applicable to cases wherein a high sensitivity image data and a low sensitivity image data captured by an image pickup device are once stored in a memory, which data are taken out of the image pickup device, fed to, for example, a PC, and wherein an image combination operation similar to the one executed by the digital signal processing unit 26a, 26b in the above-described embodiment is performed on those data in order to provide a combined image having a well-adjusted white balance and a broad dynamic range.

Third Embodiment

In third embodiment, descriptions will be given to the cases where the invention is applied to a digital still camera.

Figure 8:
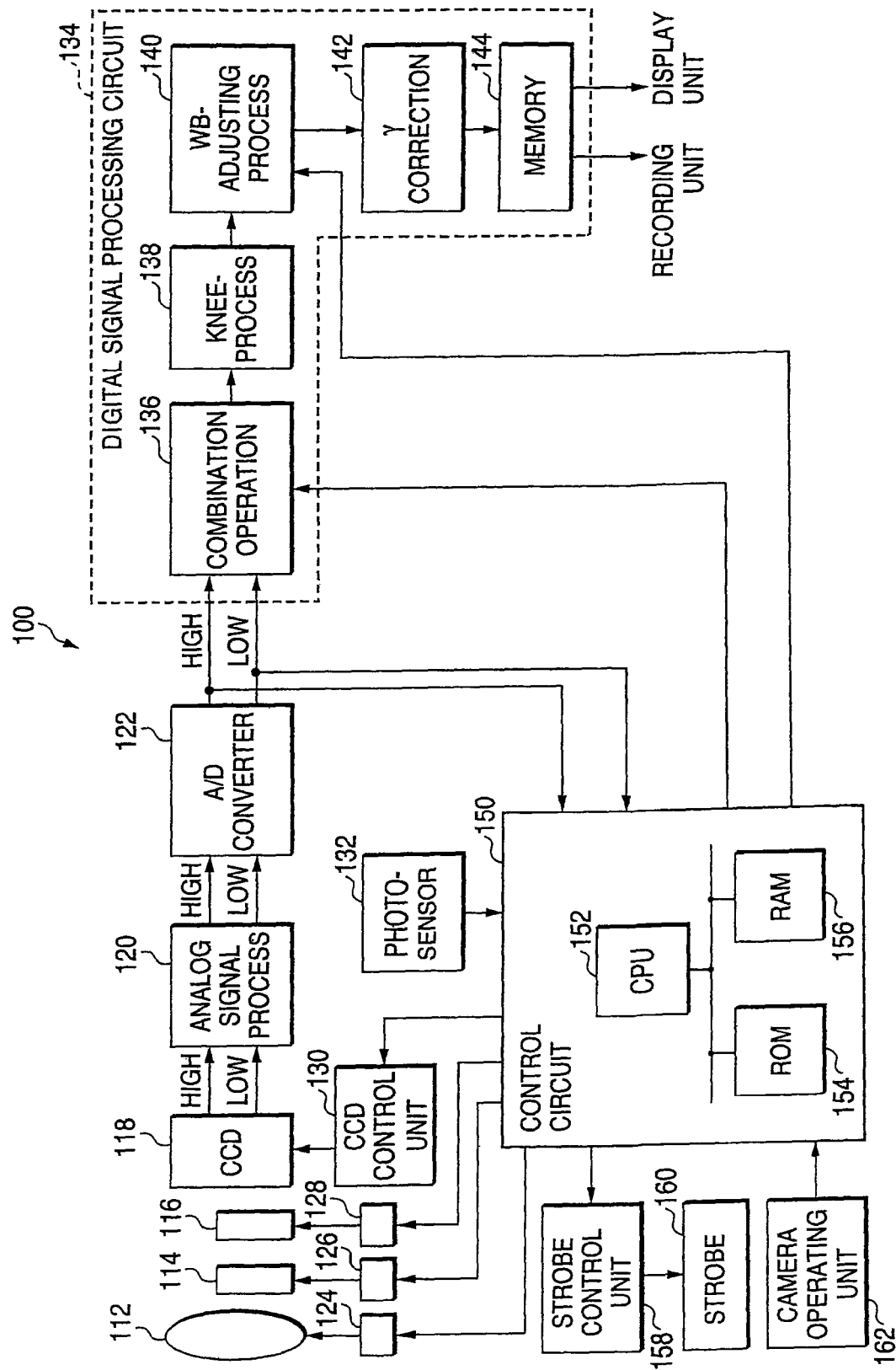
FIG. 8 is a block diagram showing the configuration of a digital camera associated with the embodiment 1 practicing the invention.

As shown in FIG. 8, a digital camera 100 as the embodiment has an optical lens 112, a diaphragm 114 which regulates the amount of light transmitting the optical lens 112, a shutter 116 which regulates the light-passing period, a CCD (Charge-Coupled Device) 118 as the image sensor which picks up a scene with high sensitivity and low sensitivity photoreceptors based on the impinging light, which representing the scene, transmitted the optical lens 112, the diaphragm 114 and the shutter 116 to output R, G and B three-color analog image signals.

The CCD 118 are, in the order, connected to an analog signal processing unit 120 which executes pre-determined analog signal processing on the high sensitivity and low sensitivity signals inputted by the CCD 118, and an analog/digital converter (hereafter, called "A/D converter") 122 which converts the high sensitivity and low sensitivity analog signals inputted from the analog signal processing unit 120.

The digital camera further has a driving unit 124 which drives the optical lens 112, a driving unit 126 which drives the diaphragm 114, a driving unit 128 which drives the shutter 116, a CCD control unit 130 which performs the timing control at imaging, a strobe control unit 158 which controls the light emission of a strobe 160 and a camera operating unit 162 such as a shutter switch.

The high sensitivity and low sensitivity digital signals (the digital values of the R, G and B signals) output from the A/D converter 122 is fed to both of a control circuit 150 (the detail will be described later) and a digital signal processing circuit 134. The digital signal processing circuit 134 has a combination operation circuit 136, a Knee-processing circuit 138, a white balance (WB) adjusting circuit 140, a gamma correction circuit 142 and a memory 144.

The combination operation circuit 136, which receives a combination command from the control circuit 150, combines the high sensitivity and low sensitivity signals inputted from the A/D converter 122 in such a manner as will be described below. The Knee-processing circuit 138 modifies the input-output characteristic in the high luminance region as required. The WB-adjusting circuit 140 has three multipliers (not shown) which modify each of the digital values of the R, G and B signals via the multiplication of respective gains. Each of the R, G and B signals is inputted to the corresponding multiplier. Further, gain values Rg, Gg and Bg for controlling white balance are inputted to the corresponding multipliers from the control circuit 150, and the multipliers use these two inputted values for multiplication. R', G' and B' signals, which have been white balance-adjusted by such operation, are fed to the gamma correction circuit 142.

The gamma correction circuit 142 modifies the input-output characteristics of the white balance-adjusted R', G' and B' signals so as to have pre-determined gamma characteristics, and further changes the 10 bits signals to 8 bits ones. The signals thus processed are stored in the memory 144.

The RGB signals outputted from the memory 144 of the digital signal processing circuit 134 are recorded in a removable recording medium such as a smart medium and memory stick not shown in the figure, and at the same time displayed on a liquid crystal display not shown.

In addition to the above-described components, the digital camera 100 is equipped with the control circuit 150 having a microcomputer containing a CPU (Central Processing Unit) 152, a ROM 154 and a RAM 156.

The control circuit 150 controls the entire operation of the digital camera 100. In the ROM 154, a threshold "th" of the amount of light received by the CCD 118 (i.e., the scene luminance) derived from f number and shutter speed of the digital camera 100, and program of process routine for judging whether or not image combination is to be carried out based on this threshold "th" and outputting a combination or no-combination command, depending on the judgment, to the combination operation circuit 136 of the digital signal processing circuit 134 are stored.

Moreover, the digital camera 100 has a photo-sensor 132 for the detection of scene luminance. The signal obtained by the light received by the photo-sensor 132 is fed to the control circuit 150. When the shutter switch is pushed halfway down, the control circuit 150 calculates the shutter speed and f number corresponding to the mode setting (for example, automatic exposure mode, aperture priority mode, or shutter speed priority mode) of the digital camera 100.

The following is the configuration of the CCD 118 associated with the embodiment.

Figure 9:
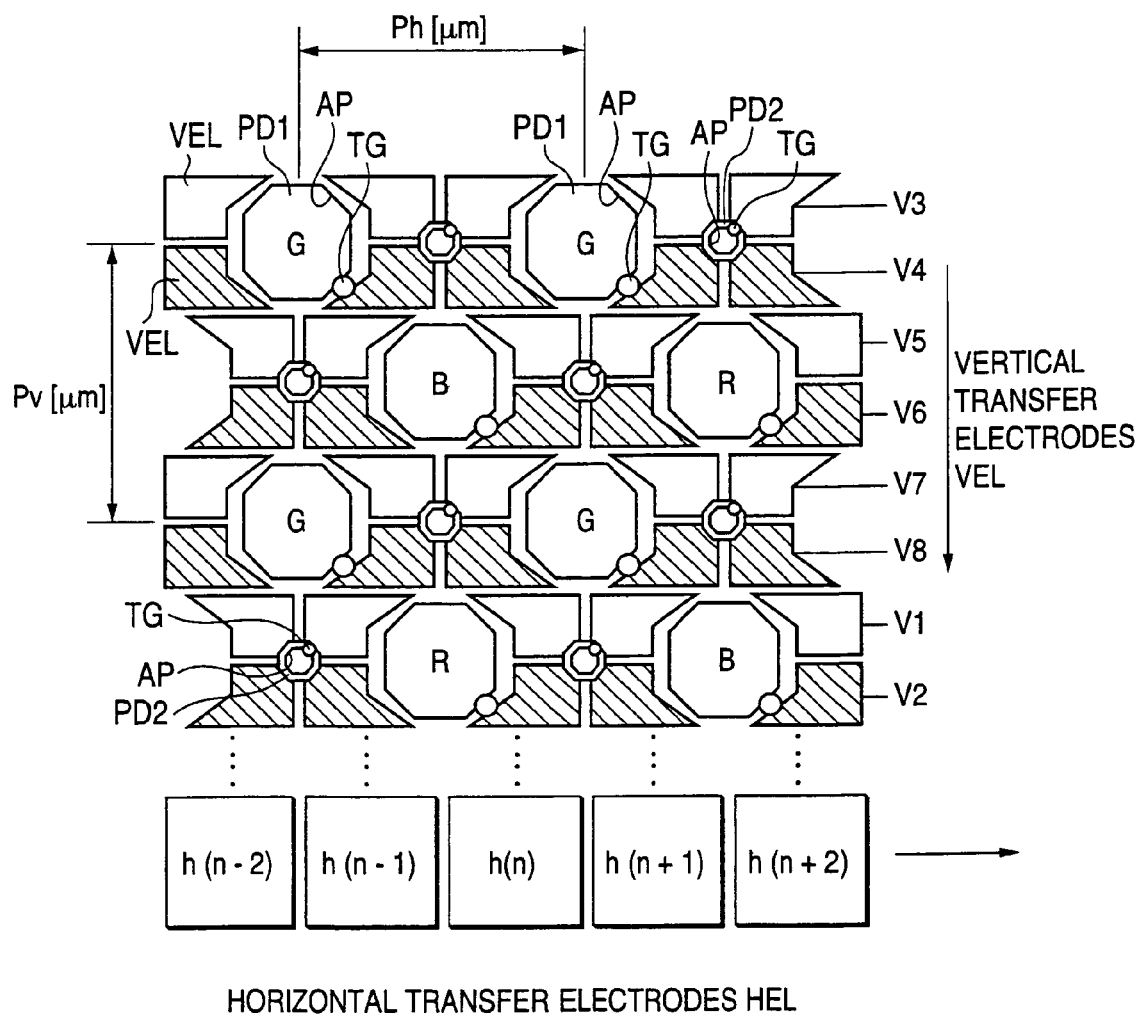
FIG. 9 is a diagram showing the outline configuration of a CCD.

As the CCD 118 can be adopted a honeycomb-type CCD as shown in FIG. 9.

The image pickup part of this CCD 118, in which one color is allotted to each pixel, is provided with a plurality of two-dimensionally arranged image sensors PD1 with predetermined pitches (horizontal pitch=Ph (μm), and vertical pitch=Pv (μm)) in a staggered mode in which adjacent photoreceptors PD1 are shifted in the vertical as well as horizontal directions, vertical transfer electrodes VEL which are arranged so as to circumvent the aperture parts AP formed in the front surface of the photoreceptors PD1 and take out signals (charge) from the photoreceptors PD1 and transfer the signals in the vertical direction, and horizontal transfer electrodes HEL which are placed at the bottom side of the vertical transfer electrodes VEL placed at the lowest position along the direction perpendicular to the paper plane and transfer the signals delivered by the vertical transfer electrodes VEL outward. In the example depicted in the figure, the aperture parts AP are fabricated in the shape of an octagonal honeycomb.

Here, vertical transfer electrode groups each comprising a plurality of the vertical transfer electrodes VEL are constructed so that one of vertical transfer driving signals V1, V2, . . . , or V8 can be applied to each electrode simultaneously. In the example shown in the figure, vertical transfer-driving signal V3 is applied to the electrode group forming the first column, vertical transfer-driving signal V4 to the electrode group forming the second column, vertical transfer-driving signal V5 to the electrode group forming the third column, vertical transfer-driving signal V6 to the electrode group forming the fourth column, vertical transfer-driving signal V7 to the electrode group forming the sixth column, vertical transfer-driving signal V8 to the electrode group forming the seventh column, and vertical transfer-driving signal V1 to the electrode group forming the eighth column, respectively.

On the other hand, each photoreceptor PD1 is designed to be electrically connected to an adjacent vertical transfer electrode VEL by means of a transfer gate TG. In the example shown in the figure, the CCD is so constructed that each photoreceptor PD1 is connected to then adjacent vertical transfer electrode VEL lying lower right by means of a transfer gate TG.

In the figure, the aperture AP formed in front of the photoreceptor PD1 designated as 'R' is covered by a color separation filter (or color filter) transmitting red light, the aperture AP formed in front of the photoreceptor PD1 designated as 'G' is covered by a color separation filter (or color filter) transmitting green light, and the aperture AP formed in front of the photoreceptor PD1 designated as 'B' is covered by a color separation filter (or color filter) transmitting blue light. In other words, the photoreceptor designated as 'R' receives red light, the photoreceptor designated as 'G' receives green light, and the photoreceptor designated as 'B' receives blue light, respectively, and each photoreceptor outputs an analog signal corresponding to the amount of received light, respectively.

The CCD 118 further comprises photoreceptors PD2 that are less sensitive than the above-described photoreceptors PD1. The photoreceptor PD2 is placed surrounded by plural photoreceptors PD1. Similar to the photoreceptor PD1, in front of the photoreceptor PD2 is provided an aperture AP which area is smaller than that of the aperture for the photoreceptor PD1. And the photoreceptor PD2 is electrically connected to an adjacent vertical transfer electrode VEL by means of a transfer gate TG. Further, the aperture AP provided in front of the photoreceptor PD2 is covered with one of R, G and B color filters as in the photoreceptor PD1. Since the light-receiving area of the photoreceptor PD2 is made smaller than that of the photoreceptor PD1 in this way, RGB signals of sensitivities lower than those obtained by the photoreceptor PD1 can be acquired.

The electrode to which the transfer gate TG of the photoreceptor PD2 is connected is provided independent of the electrode to which the transfer gate TG of the adjacent photoreceptor PD1 is connected. In the present embodiment, after the reading out of the charge of the photoreceptor PD1, then the charge of the photoreceptor PD2 is read out.

The photoreceptor PD1 of the embodiment corresponds to the first photoreceptor of the invention, while the photoreceptor PD2 of the embodiment corresponds to the second photoreceptor of the invention.

Figure 10:
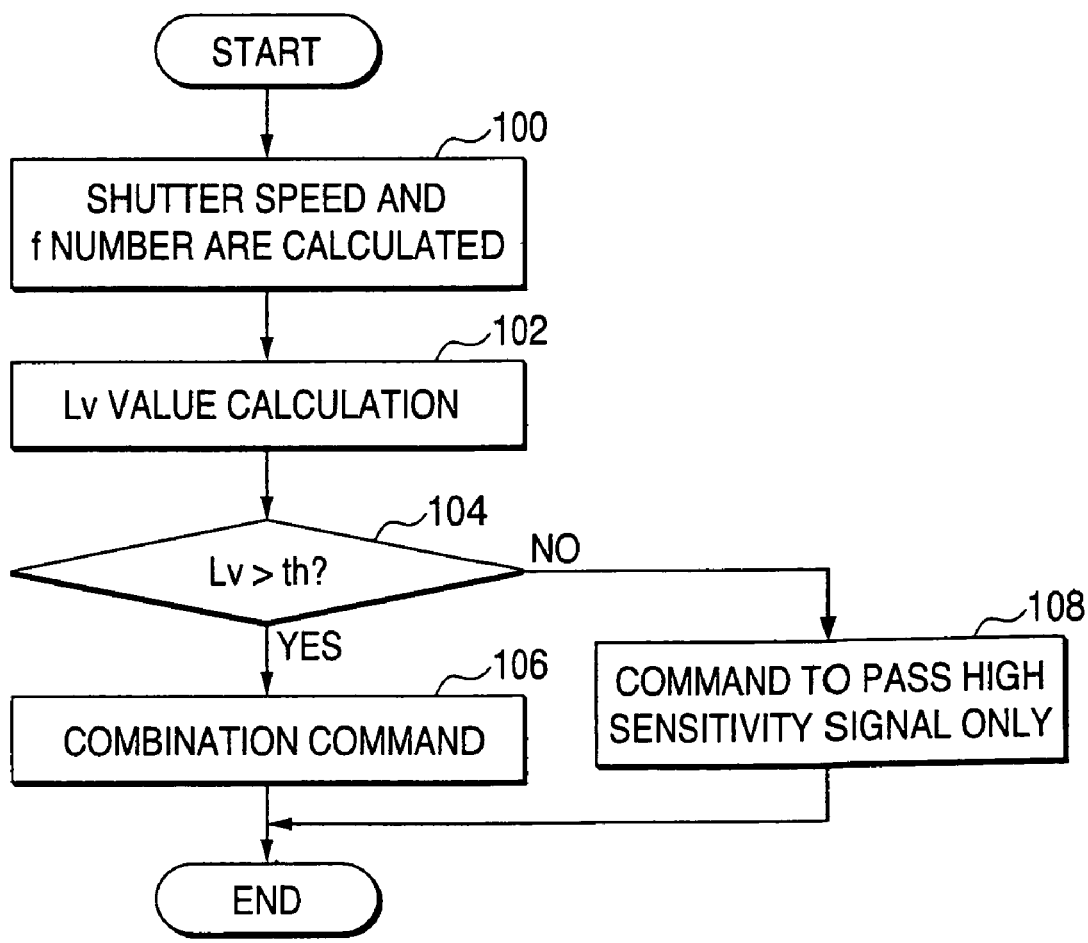
FIG. 10 is a flowchart showing the flow of a combination judgment routine.

The combination command routine in the control circuit 150 of the digital camera 100 now be described in detail using the flowchart in FIG. 10.

First of all, the light, which that represents a scene image, transmitted the optical lens 112, the diaphragm 114 and the shutter 116 is received by both of the photoreceptors PD1 and PD2 of the CCD 118 having different sensitivities. An analog image signal representing the scene image is outputted to the analog signal processing unit 120. When the camera operator pushes the shutter switch halfway down in order to pick up this scene with the digital camera 100, a shutter speed (F) and a f number (T) are calculated based on the signal inputted from the photo-sensor 132 under such shutter switch condition of halfway pushing down as a step 100, and the driving units 126 and 128 are controlled.

The analog signal processing unit 120 executes the predetermined analog signal process for both of the high sensitivity and low sensitivity signals inputted from the CCD 118. These analog signals are converted to respective digital ones by means of the A/D converter 122. The digital signals outputted from the A/D converter 122 are inputted to the digital signal processing circuit 134 and the control circuit 150.

In the next step 102, an "Lv" value showing the luminance of the imaging environment for the digital camera is derived on the basis of the calculated shutter speed (F) and the f number (T). One example of this derivation procedure is shown below.

From the shutter speed "F", an "Av" value showing the shutter speed in terms of APEX value according to the following formula.

$$F^2 = 2^{Av}$$

Further, from the f number "T", a "Tv" value showing the f number in terms of APEX value according to the following formula.

$$1/T = 2^{Tv}$$

Then, "Av" value and "Tv" value, which are obtained by the two formulae above, are combined to give "Ev" (representing the amount of received light).

$$Ev = Av + Tv$$

The resulting "Ev" value is used as "Lv" is.

$$Ev = Lv$$

Figure 11:
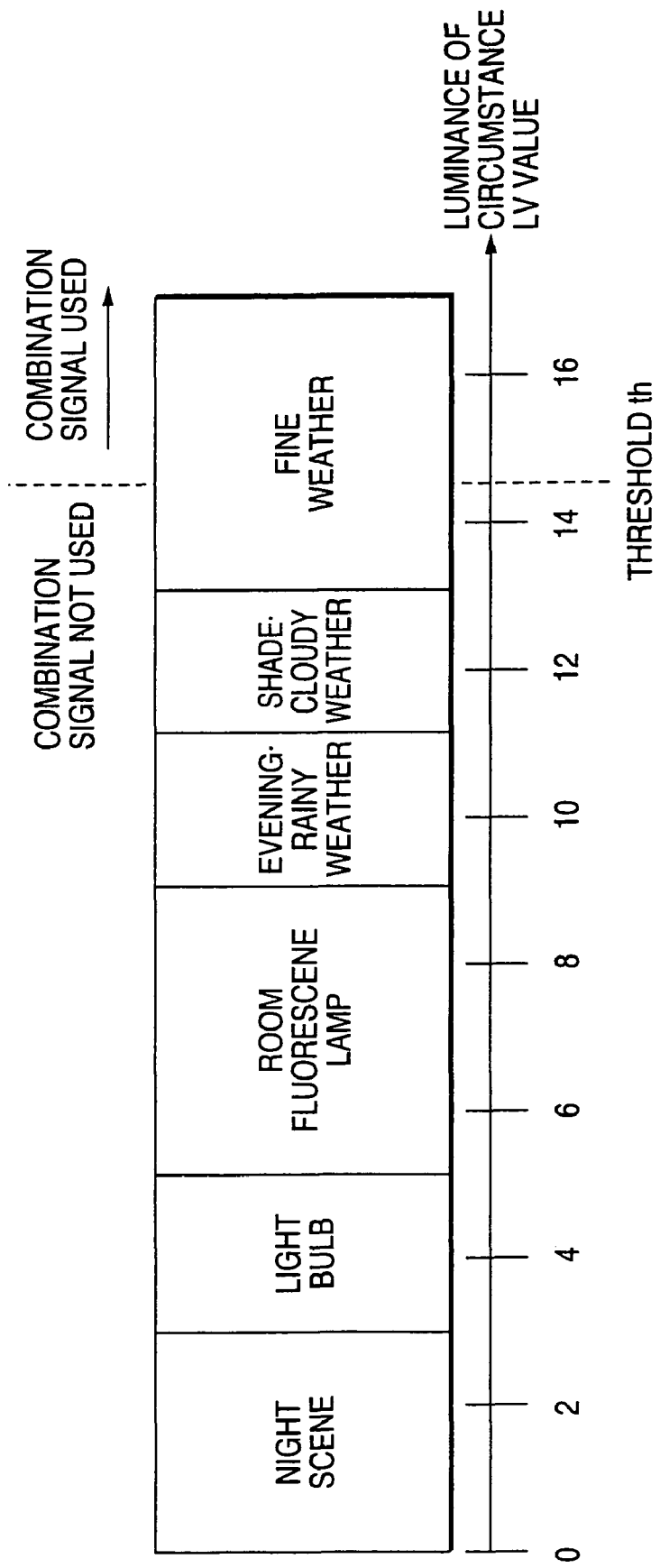
FIG. 11 is a diagram showing the relation of the threshold for the necessity of combination operation to the types of the ordinary shooting condition as well as the scene luminance (Lv value)

Now, the derived Lv value is compared with the threshold "th" stored in the ROM 154 in step 104. FIG. 11 shows the relation between the general class of imaging condition and the luminance Lv for the imaging condition. In the embodiment, the threshold "th" is established for the range of clear sky under which the scene is highly contrasty (in the range between 14 and 16 in terms of Lv, preferably Lv=14.5). If the Lv value is larger than this threshold th (Lv>th), then a judgment is made that image combination is necessary since the imaging condition is highly contrasty, i.e., the scene contains high luminance subjects. On the other hand, if the derived Lv value is below the threshold th (Lv≦th), then a judgment is made that image combination is not necessary since the imaging condition is of low contrast, i.e., the scene contains low luminance subjects.

Accordingly, when judged Lv>th in step 104, a combination command signal is output from the control circuit 150 to the combination operation circuit 136 in step 106.

The combination command signal is inputted to the combination operation circuit 136, the combination operation circuit 136 combines the high sensitivity signal and the low sensitivity signal inputted from the A/D converter 122 with the arithmetic addition method represented by the following formula.

$$\text{data} = \{w_h \times \text{high} + w_l \times (\text{low} - th/S + th)\} / \{w_h + w_l\}$$

In the formula, "S" represents the ratio (sensitivity ratio) of the high sensitivity signal to the low sensitivity signal, which takes values equal or larger than "1". "th" is the threshold indicating the level at which the calculation of the combined signal data for image formation starts. "high" is the value of the high sensitivity signal, and "$w_h$" is a value representing the weight of the high sensitivity signal. "low" is the value of the low sensitivity signal, and "$w_l$" is a value representing the weight of the high sensitivity signal.

Figure 12:
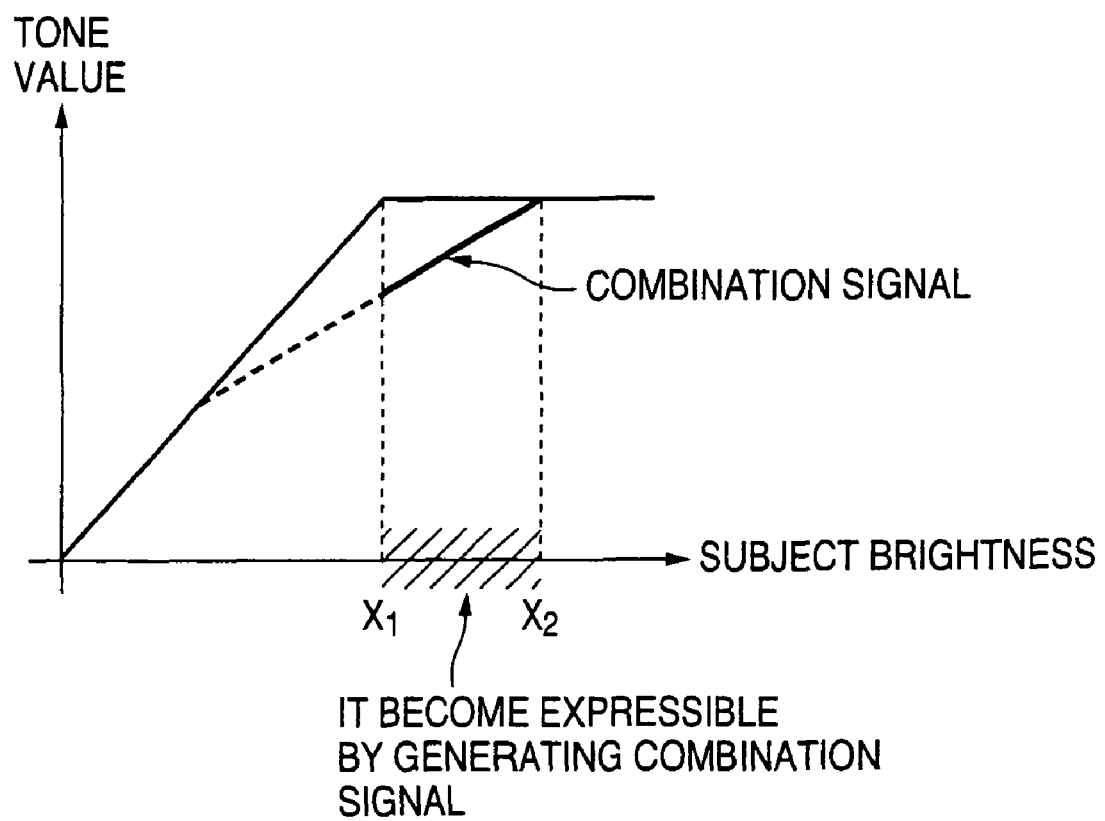
FIG. 12 is a diagram showing the relation between the high sensitivity signal prior to image combination and the combined signal obtained by image combination operation.

FIG. 12 shows the relation between the high sensitivity signal obtained by receiving the light from the scene with use of the digital camera 100 under a imaging condition giving the judgment Lv>th and the combined signal obtained by combining the high sensitivity signal with the low sensitivity signal as described above. The thin line in the figure indicates the high sensitivity signal prior to image combination, and the thick line indicates the combined signal resulting from the combination operation. As for scene luminance, "$X_1$" indicates the maximum expressible scene luminance value without image combination, while "$X_2$" indicates the maximum scene luminance that has become expressible after image combination. In this example, the luminance of the scene "$X_2$" to be picked up is larger than "$X_1$". The figure shows the data on one color chosen from R, G and B.

As is evident from FIG. 12, the scene luminance level to which tonal information is expressible is expanded from "$X_1$" to "$X_2$" owing to the above-described combination operation. Thus, in the case where the scene contains subjects having luminances higher than "$X_1$", the dynamic range can be preferably expanded via the execution of combination operation, leading to an expressible range expansion. After the image combination operation, an image of the scene is formed with both of the high sensitivity signal and the combined signal shown by the thick solid line in the figure, and the image is output to the Knee-processing circuit 138.

In contrast, for the judgment of Lv≦th in step 104, image combination is not necessary. Thus, a command signal directing to pass the high sensitivity signal only without combination operation is delivered to the combination operation circuit 136 in step 108. When the combination operation circuit 136 receives this command signal, the combination operation circuit 136 allows the high sensitivity signal to pass the circuit and outputs to the Knee-processing circuit 138. Since the high sensitivity signal is used up to the scene luminance of "$X_1$", an effective use of the tone values in the high luminance region is achieved.

After the process by the Knee-processing circuit 138, the WB-adjusting circuit 140 and the gamma-correcting circuit 142 perform predetermined process, and then the liquid crystal displays as, for example, through images. When image is picked up with the shutter switch completely pushed down, the image data is stored in the memory 144, and at the same time recorded in a removable recording medium such as a smart medium, memory stick and the like.

As described above, it is judged whether or not the combination of the high sensitivity signal and the low sensitivity signal is necessary based on the scene luminance, and the signals are combined according to a result of the judgment. Therefore, not only preferable images are formed, but also the dynamic range can be effectively used.

Figure 13:
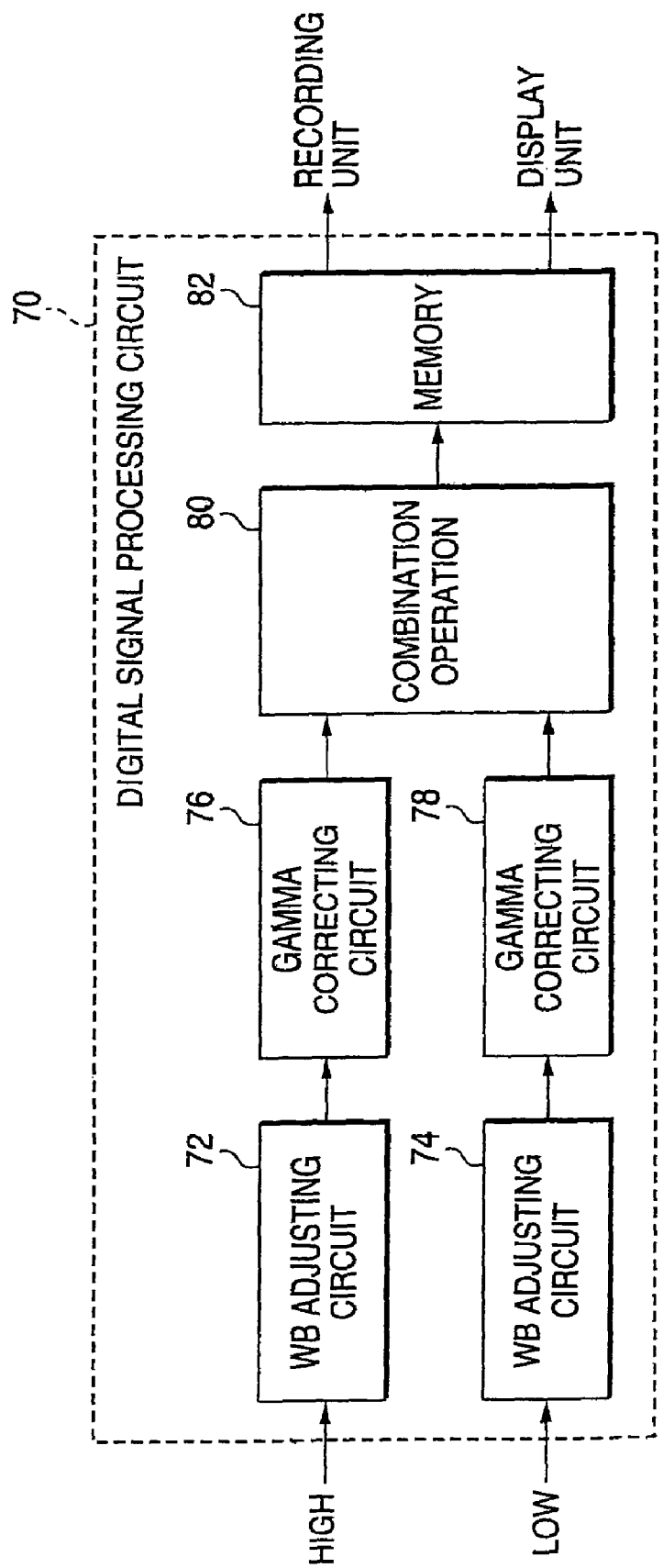
FIG. 13 shows the configuration of the digital signal-processing circuit in a digital camera associated with the embodiment 2 practicing the invention.

In the embodiment described above, the example of combining, by the combination operation circuit 136, the high sensitivity signal with the low sensitivity signal inputted from the A/D converter 122 prior to white balance adjustment and gamma correction was described. In the following, another embodiment is described in which white balance adjustment and gamma correction are performed for the high sensitivity signal and the low sensitivity signal prior to image combination followed by the combination by the logarithmic addition method. FIG. 13 shows the configuration of a digital signal processing circuit 70 for the another embodiment. The digital signal processing circuit 70 has a WB (white balance) adjusting circuit 72 for high sensitivity signal which adjusts the white balance of the high sensitivity signal, a WB adjusting circuit 74 for e low sensitivity signal which adjusts the white balance of the low sensitivity signal, a gamma-correcting circuit 76 for high sensitivity signal which is connected to the WB adjusting circuit 72 and executes the gamma correction of the high sensitivity signal, a gamma-correcting circuit 78 for low sensitivity signal which is connected to the WB-adjusting circuit 74 and executes the gamma correction of the low sensitivity signal, an image combination circuit 80 and a memory 82.

According to the configuration shown in FIG. 13, the high sensitivity signal and the low sensitivity signal are subjected to respective white balance adjustments corresponding to their characteristics and performed by the WB-adjusting circuit 72 and 74, further subjected to respective gamma corrections performed by the gamma-correcting circuit 76 and 78, and delivered to the combination operation circuit 80. The combination operation circuit 78 combines the inputted high sensitivity and low sensitivity signals in the case of receiving a combination command from the control circuit 150 in the same manner as in the previous embodiment. In the case of receiving a command of no need of combination, the combination operation circuit 78 allows only the high sensitivity to pass through.

Figure 14:
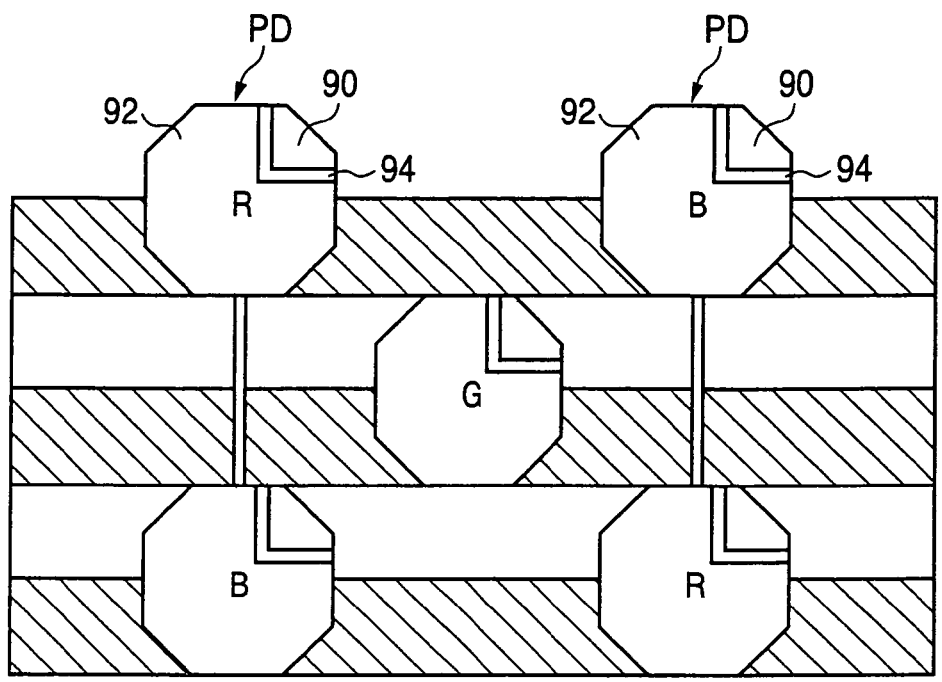
FIG. 14 shows the outline configuration of a CCD containing photoreceptors each of which can receive both of high sensitivity and low sensitivity signals.

In the two embodiments described above, the cases where the high sensitivity photoreceptors PD1 and the low sensitivity photoreceptors PD2 were formed separately to obtain a high sensitivity signal and a low sensitivity signal respectively were explained. However, another configuration may be used in which a single type of photoreceptor PD is divided into a high sensitivity region 92 having a large photo-receptive area capable of high sensitivity photo-reception and a low sensitivity region 90 having a small photo-receptive area capable of low sensitivity photo-reception by means of a channel stopper 94, and in which a high sensitivity signal and a low sensitivity signal can be obtained from the two regions, respectively, as shown in FIG. 14 owing to the channel stopper 94 provided in the photoreceptor PD, the signal formed by the high sensitivity photoreception can be separated from the one formed by the low sensitivity photoreception, since the two signals are not mixed.

In the above-described embodiments, the decision of combination or no combination was made by the "Lv" value. Alternatively, the high sensitivity signal and the low sensitivity signal may be always combined according to the combination formula cited previously, and a decision based on the "Lv" value may be made on whether or not the combined signal should be used for image formation.

In the above-described embodiment, the judgment whether image combination is necessary or not was made on the basis of the "Lv" value (representing the luminance of the imaging environment). However, the judgment on the type of the scene-illuminating light source derived by integrating each of the R, G, and B digital color signals for the purpose of acquiring the gain value for white balance adjustment may be applied to the present judgment on image combination instead of "Lv" value. For example, as shown in FIG. 11, image combination is judged necessary for the case where the subject is placed under a clear sky (i.e., the scene illuminant is a clear sky), and for all the other types of scene illuminants, image combination is judged unnecessary.

Furthermore, both of the type of scene illuminant and the "Lv" value may be used for the judgment on the combination necessity.

The application of the invention is not limited to digital cameras of the above-described types, but to various image pickup devices.

As described above, according to the embodiments, since the signal output from the first photoreceptor or a combined signal is used depending on the imaging condition, preferable effects can be achieved such as dynamic range expansion and the formation of preferably shot images due to the use of tone values towards the highlight region.

Forth Embodiment

A solid-state image sensor according to forth embodiment is same as that of the first embodiment shown in FIG. 2.

A dynamic range-expanded imaging apparatus of forth embodiment, a low sensitivity image (image picked up by the low speed pixel 2) and a high sensitivity image (image picked up by the high speed pixel 3) are simultaneously obtained, and that image signals are read out sequentially from each pixels 2 and 3, which are additively combined to output.

Figure 15:
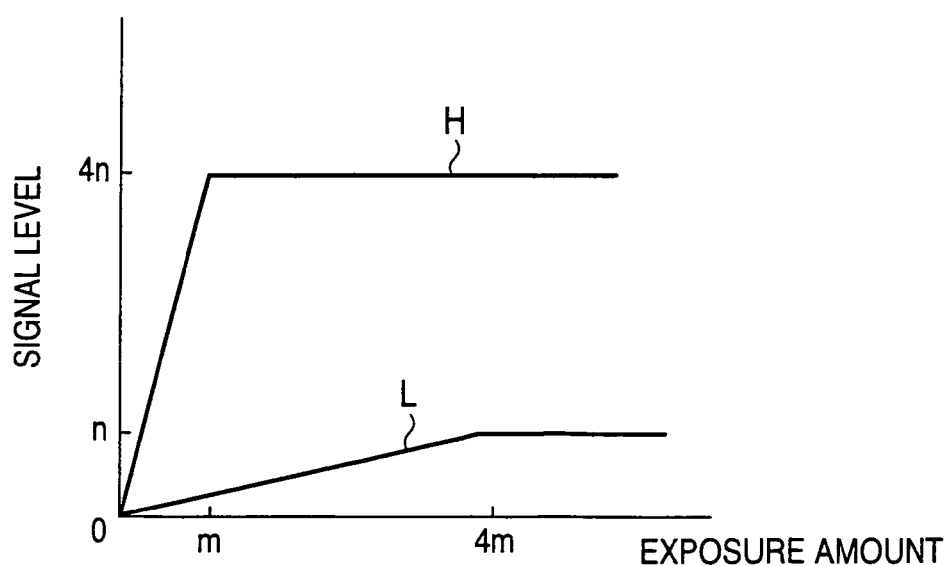
FIG. 15 is a diagram describing the signal levels obtained by the high and low sensitivity pixels shown in FIG. 2.

FIG. 15 is a diagram showing a general tendency of the relation of signal levels of low and high sensitivity signals relative to exposure amount. In the illustrated example, while the saturation signal level for the low sensitivity signal "L" is "n", the saturation signal level for the high sensitivity signal "H" is "4n" which is four times of "n". And, as for the exposure amount with which the signal level reaches to saturation, the saturation exposure for the low sensitivity pixel 2 is four times as large as that for the high sensitivity pixel 3. Thus, when the latter is represented by "m", then the former is equal to "4m". Although such characteristics have been derived from the fact that the area of the high sensitivity pixel 3 is 4 times as large as that of the low sensitivity pixel 2, the actual saturation signal ratio or ratio of saturation exposure does not always reflect the area ratio of the two kinds of pixels.

Figure 16:
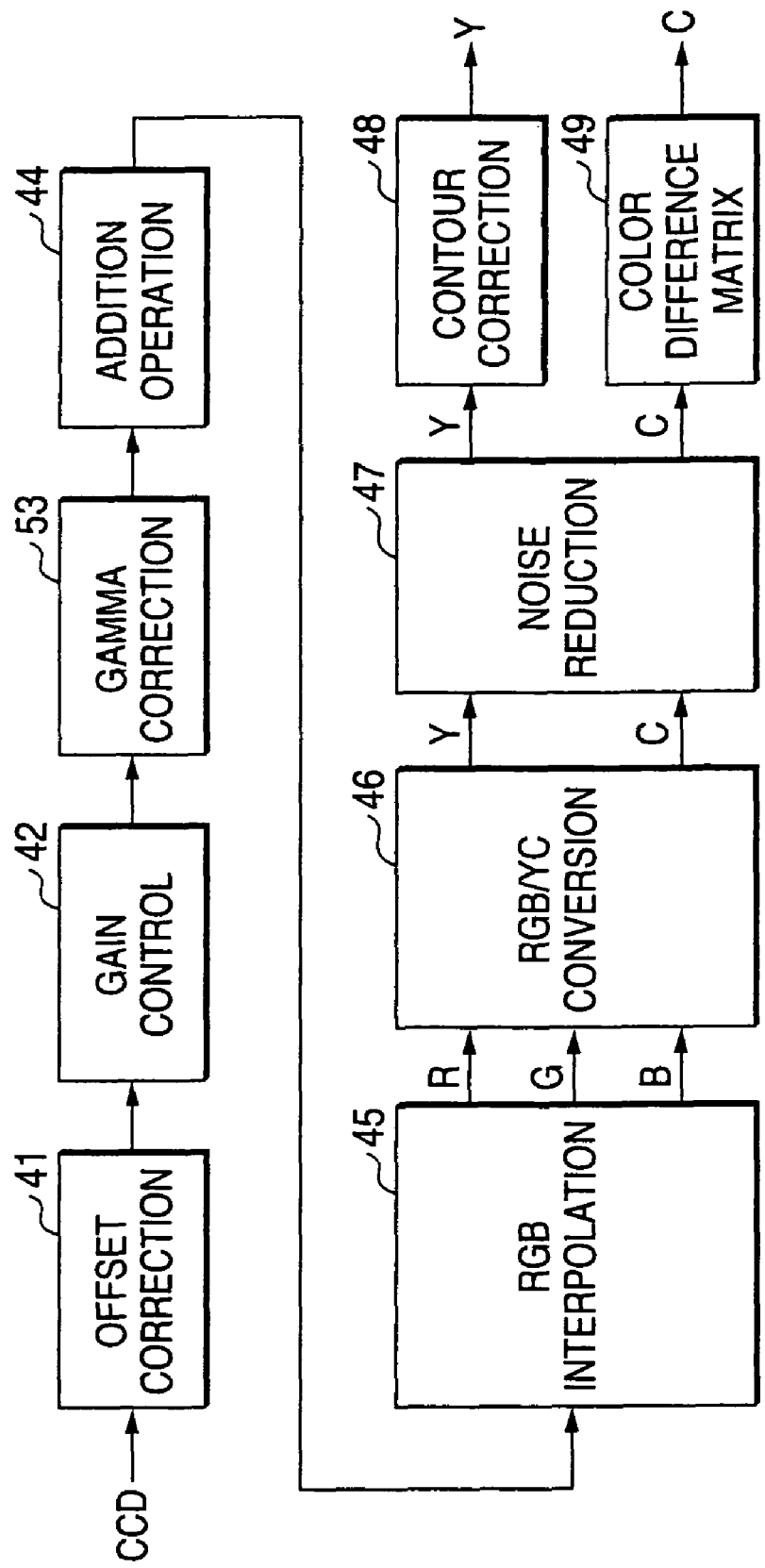
FIG. 16 is a block diagram of the output circuit section in a dynamic range-expanded image-capturing unit according to one embodiment of the invention.

FIG. 16 is the block diagram of the output circuit in the dynamic range-expanded imaging apparatus having a CCD section which pixel arrangement is above described of the embodiment. This output circuit includes an offset correction circuit 11 which takes in the digital RGB color signals that are output from each pixel (CCD) 1 shown in FIG. 2 and A/D converted and executes an offset process, a gain control circuit 12 which adjusts white balance, a gamma correction circuit 13 which executes gamma correction (γ conversion) on the gain-corrected color signals in a manner to be described in detail later, and an addition operation circuit 14.

The output circuit further includes an RGB interpolation operator part 15 which executes an interpolation calculation for the RGB signals after the addition operation to derive the RBG three-color signals at each pixel position, an RGB/YC converting circuit 16 which obtains the luminance signal Y and color-difference signal C from the RGB signals, a noise reduction circuit 17 which reduces noise from the luminance signal Y and the color-difference signal C, a contour correction circuit 18 which executes contour correction for the noise-reduced luminance signal Y, and a color difference matrix circuit 19 which executes color hue correction via multiplying a color difference matrix on the color-difference signal C after noise reduction.

Figure 17:
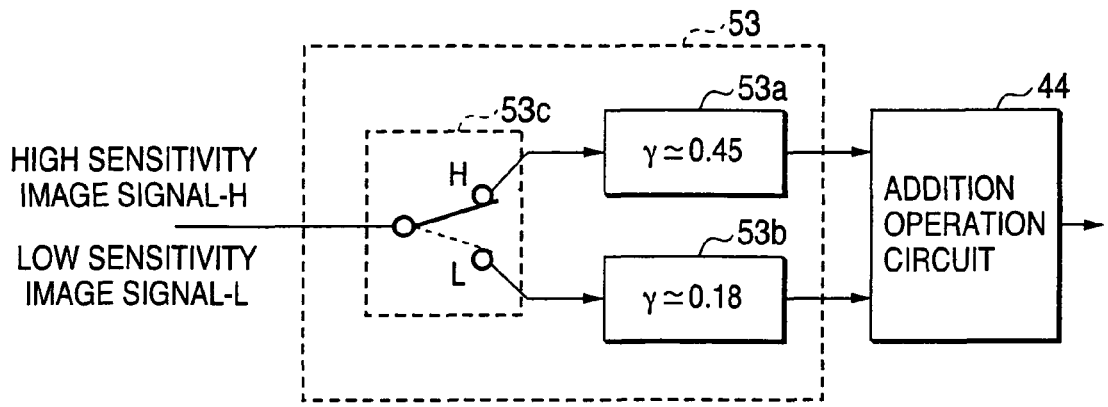
FIG. 17 is a block diagram of the gamma-correcting circuit shown in FIG. 16.
Figure 18:
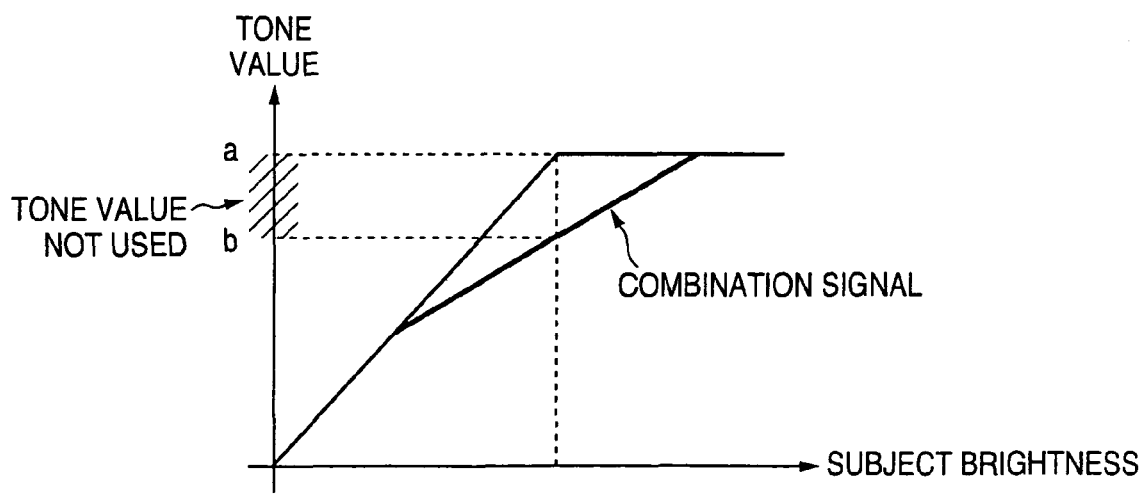
FIG. 18 shows the relation between the high sensitivity signal prior to combination and a combined signal obtained by a combination operation based on a conventional technique.

FIG. 17 is the block diagram for the gamma correction circuit 13 and addition operation circuit 14, both shown in FIG. 16. The gamma correction circuit 13 has a first gamma correction circuit 13*a*, a second gamma correction circuit 13*b*, and a switching circuit 13*c* which takes in the output signal from the gain control circuit 12 in FIG. 16 and outputs it to either of the gamma correction circuits 13*a* and 13*b*. The addition operation circuit 14 additively combines the output signal of the first gamma correction circuit 13*a* and the output signal of the second gamma correction circuit 13*b* to output the combined signal to the subsequent RGB interpolating part 15.

The signal charge detected by the low sensitivity pixel 2 and the signal charge detected by the high sensitivity pixel 3 are read from each pixel 1 in the dynamic range-expanded imaging apparatus, as distinguished each other. When an image signal read from the high sensitivity pixel 3 is inputted to the gamma correction circuit 13 via the offset correction circuit 11 and the gain control circuit 12, the switching circuit 13*c* delivers this input signal to the first gamma correction circuit 13*a*. When an image signal read from the low sensitivity pixel 2 is inputted to the gamma correction circuit 13 via the offset correction circuit 11 and the gain control circuit 12, the switching circuit 13*c* delivers this input signal to the second gamma correction circuit 13*b*.

In the operation of γ conversion, an output signal is derived by raising the input signal value of the γ power. The "γ" value used for the operation is not set at a constant value over the entire input signal range, but is generally modified "γ" value as the base by about 10% according to ranges. A table data of the first gamma character based on γ=0.45 is set to the first gamma correction circuit 13a. A table data of the second gamma character based on γ=0.18 is set to the second gamma correction circuit 13b.

In the dynamic range-expanded imaging apparatus, the image signal read from the high sensitivity pixel 3 is subjected to the γ-conversion with "γ" value of about 0.45 executed by the first gamma correction circuit 53a to output to the addition operation circuit 44. On the other hand, the image signal read from the low sensitivity pixel 2 is subjected to the γ-conversion with "γ" value of about 0.18 executed by the second gamma correction circuit 53b to output to the addition operation circuit 44.

The addition operation circuit 44 executes the addition operation of the image signal, which was γ converted by the first gamma correction circuit 53a, from the high sensitivity pixel 3 and the image signal, which was γ converted by the second gamma correction circuit 53b, from the low sensitivity pixel 2 on pixel-by-pixel basis, and then outputs.

As described above, according to the embodiment, image data from the low sensitivity pixel and image data from the high sensitivity pixel are respectively γ converted with γ characteristic which is different over the entire range of input signal and then additively combined to generate reproduced images. Therefore, the deterioration of white balance and the deterioration of tone reproduction in the middle luminance range can be avoided without executing weighted addition depending on signal levels, and thus images which is natural with an extended dynamic range can be obtained. Moreover, the γ value for the image signal from the low sensitivity pixel is set lower than the image signal from the high sensitivity pixel, more preferable image can be obtained.

By way of precaution, the invention is not restricted to the above-described embodiment at all, though the above embodiment dealt with a solid-state imaging apparatus equipped with both of high and low sensitivity pixels. The concept of the invention can be achieved by the installation in a digital still camera and the like of a control circuit that sequentially captures high and low sensitivity images through shutter speed control, etc., and then executes γ-conversion on each of the image signals with use of a γ character differing from each other followed by the addition of the two kinds of signals.

What is claimed is:

1. An image pickup apparatus comprising:
   an imaging device including
      first photoreceptors which have a first sensitivity and receive light from a subject to output first signals corresponding to an amount of the received light, and
      second photoreceptors which have a second sensitivity lower than the first sensitivity and receive the light from the subject to output second signals corresponding to the amount of the received light;
   a judging unit that judges an illumination light source type and judges, based on the judged illumination light source type, whether or not the first signals output from the first photoreceptors and the second signals output from the second photoreceptors are to be combined; and
   a display unit, wherein
   the display unit displays an image based on signals obtained by combining the first signals output from the first photoreceptors and the second signals output from the second photoreceptors when the judging unit judges that the first signals output from the first photoreceptors and the second signals output from the second photoreceptors are to be combined, and
   the display unit displays an image based on the first signals output from the first photoreceptors when the judging unit judges that the first signals output from the first photoreceptors and the second signals output from the second photoreceptors are not to be combined.

2. The image pickup apparatus according to claim 1, wherein an area of an aperture formed above each of the first photoreceptors is larger than that of an aperture formed above any of the second photoreceptors.

3. The image pickup apparatus according to claim 1, wherein only when the judging unit judges that the illuminating light source type corresponds to clear sky, the judging unit judges that the first signals output from the first photoreceptors and the second signals output from the second photoreceptors are to be combined.

4. The image pickup apparatus according to claim 1, further comprising:
   a calculation unit that calculates the amount of the light received by the imaging device, wherein
   the judging unit judges, based on the judged illumination light source type and the calculated amount of the received light, whether or not the first signals output from the first photoreceptors and the second signals output from the second photoreceptors are to be combined.

5. The image pickup apparatus according to claim 4, wherein only when the judged illumination light source type corresponds to clear sky and the calculated amount of the received light exceeds a predetermined value, the judging unit judges that the first signals output from the first photoreceptors and the second signals output from the second photoreceptors are to be combined.

6. The image pickup apparatus according to claim 5, wherein the calculating unit calculates the amount of the received light based on an f number and a shutter speed of the image pickup apparatus.

7. The image pickup apparatus according to claim 4, further comprising:
   color filters that are provided above at least a part of the first and second photoreceptors, wherein
   when the calculated amount of the received light is equal to or less than a predetermined value, the display unit displays the image based on the first signals without using the second signals.

* * * * *